United States Patent [19]

Tanahashi et al.

[11] Patent Number: 5,795,992
[45] Date of Patent: Aug. 18, 1998

[54] METHOD OF TESTING DURABILITY OF EXHAUST GAS PURIFICATION DEVICE

[75] Inventors: Toshio Tanahashi, Susono; Masakatsu Sanada, Numazu; Hiroyuki Domyo, Susono; Hiroshi Hirayama, Okazaki; Kazuaki Sobue, Toyota; Tsuneo Higashi, Susono; Koji Yokota, Nagoya; Hideo Sobukawa, Nisshin; Tadashi Suzuki, Seto; Shinichi Matsunaga, Owariasahi, all of Japan

[73] Assignees: Toyota Jidosha Kabushiki Kaisha; Kabushiki Kaisha Toyota Chuo Kenkyusho, both of Aichi, Japan

[21] Appl. No.: 765,365

[22] PCT Filed: May 17, 1996

[86] PCT No.: PCT/JP96/01318

§ 371 Date: Feb. 10, 1997

§ 102(e) Date: Feb. 10, 1997

[87] PCT Pub. No.: WO96/36863

PCT Pub. Date: Nov. 21, 1996

[30] Foreign Application Priority Data

May 18, 1995 [JP] Japan ................................ 7-119877

[51] Int. Cl.⁶ .................................................. G01M 15/00
[52] U.S. Cl. .......................... 73/23.31; 60/276; 73/118.1
[58] Field of Search ........................... 73/23.31, 23.32, 73/117.1, 117.2, 117.3, 118.1; 60/276, 277, 285; 123/688

[56] References Cited

U.S. PATENT DOCUMENTS

| | | | |
|---|---|---|---|
| 5,526,643 | 6/1996 | Mukaihira et al. | 60/277 |
| 5,531,069 | 7/1996 | Katasuhiko | 60/277 |
| 5,560,200 | 10/1996 | Maus et al. | 60/277 |
| 5,591,905 | 1/1997 | Fujimoto et al. | 60/277 |
| 5,622,048 | 4/1997 | Aoyama et al. | 60/277 |
| 5,636,514 | 6/1997 | Seki | 60/277 |
| 5,649,420 | 7/1997 | Mukaihira et al. | 60/277 |

FOREIGN PATENT DOCUMENTS

| | | |
|---|---|---|
| 57-160042 | 10/1982 | Japan . |
| 62-71544 | 5/1987 | Japan . |
| 4-72410 | 3/1992 | Japan . |
| 5-248227 | 9/1993 | Japan . |

*Primary Examiner*—Richard Chilcot
*Assistant Examiner*—Eric S. McCall
*Attorney, Agent, or Firm*—Oliff & Berridge, PLC

[57] ABSTRACT

An internal combustion engine in which a three-way catalyst (12) for purification of the exhaust gas is arranged in the exhaust passage, wherein the relationship between the magnitude of the stress causing deterioration of the three-way catalyst (12), for example the catalytic bed temperature, and the rate of deterioration of the performance of the catalyst is found. A durability test is performed by raising the catalytic bed temperature higher than that of the vehicle under market driving. The length of the durability test at this time is determined from the relationship between the catalytic bed temperature and the rate of deterioration of the performance of the catalyst so as to give the same degree of deterioration of the performance of the catalyst as with market driving. The length of the durability test required for giving the same degree of deterioration of the performance of the catalyst is much shorter than the market driving time.

47 Claims, 14 Drawing Sheets

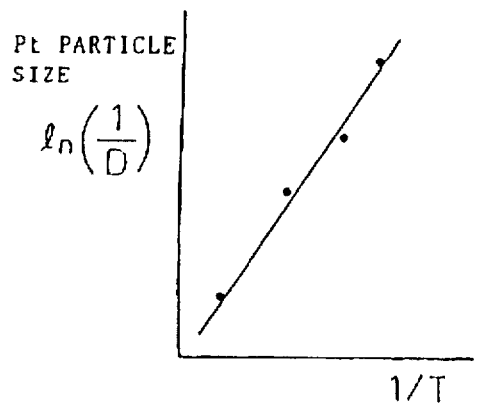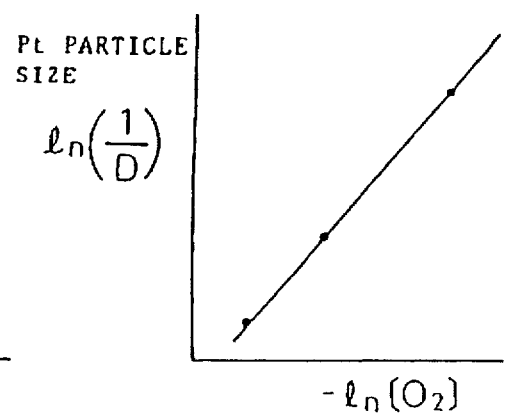
Fig. 3A
Fig. 3B
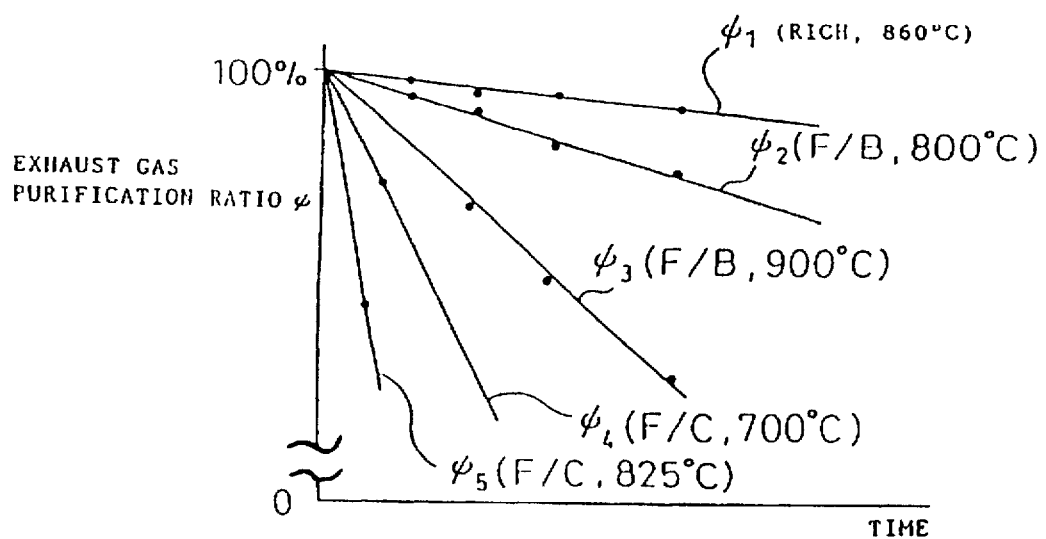
Fig. 4

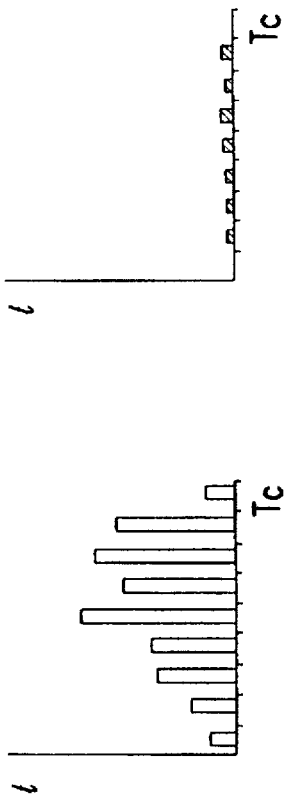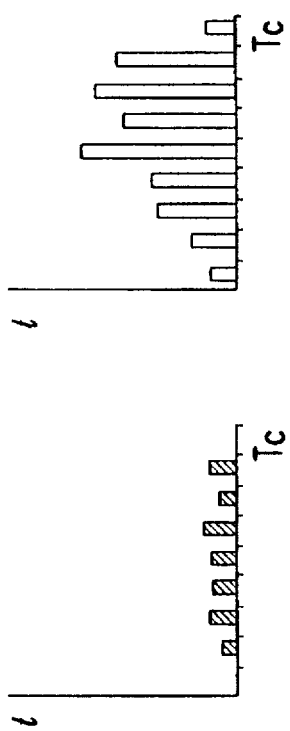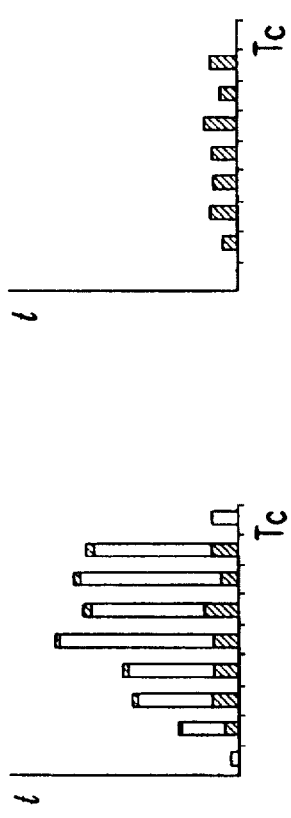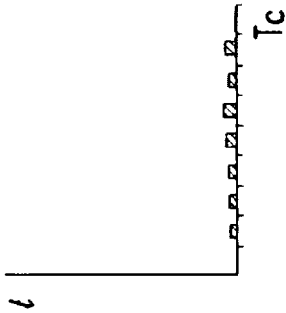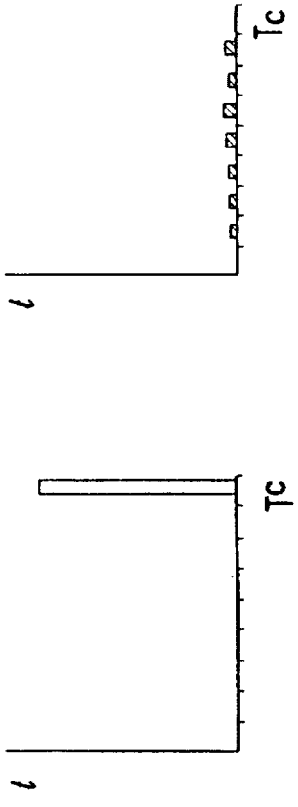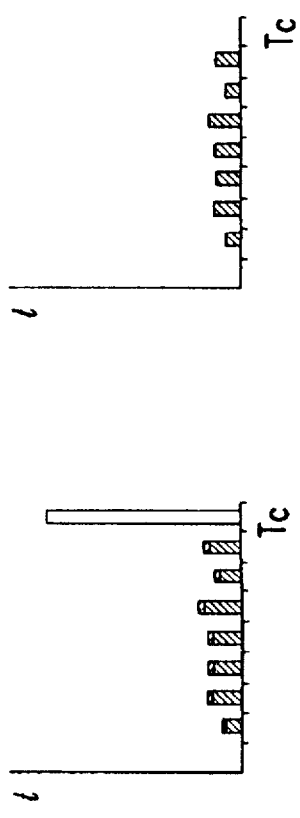
FIG.11(A) FIG.11(B) FIG.11(C) FIG.11(D) FIG.11(E) FIG.11(F) FIG.11(G) FIG.11(H)

5,795,992

1

METHOD OF TESTING DURABILITY OF EXHAUST GAS PURIFICATION DEVICE

TECHNICAL FIELD

The present invention relates to an exhaust gas purification device of an internal combustion engine.

BACKGROUND ART

An exhaust gas purification device, for example, exhaust gas purification catalyst, of an internal combustion engine gradually deteriorates in the course of use. Along with this, its performance in purifying the exhaust gas gradually declines. If the performance of purification of the exhaust gas declines, air pollution is caused. Therefore, to suppress air pollution when a vehicle is used for a long period of time, it is necessary to determine to what extent the purification performance has declined. Accordingly, in the past, durability tests have been conducted wherein the vehicle is driven on a vehicle chassis dynamometer by a driving pattern representative of the market driving of the vehicle until the driving distance reaches a target driving distance required for example in emission controls (for example see Japanese Unexamined Patent Publication (Kokai) No. 57-160042). The performance in purification of exhaust gas is measured at the point of time when such a durability test is completed.

Recently, however, the target driving distance required in emission controls has become much longer due to tougher air pollution regulations. If the target driving distance required in emission controls becomes longer, the time required for the durability test becomes longer and therefore the problem arises of a longer time required for development of vehicles.

DISCLOSURE OF THE INVENTION

An object of the present invention is to provide a method of testing the durability of an exhaust gas purification device able to evaluate in a short period of time the exhaust purification performance of a vehicle after market driving over a long period of time.

According to the present invention, there is provided a method of testing the durability of an exhaust gas purification device which creates the same state of deterioration of the exhaust gas purification device as if the vehicle were actually market driven for a predetermined target driving distance or target driving time. The method of testing durability of an exhaust gas purification device provides a reduced period (a shortened deterioration time) for the catalyst to reach about the same degree of deterioration as when the vehicle is market driven for the target driving distance or target driving time. The reduced period is achieved because a stress higher than the stress applied to the market-driven catalyst is applied to the catalyst. The amount of stress is determined from the relationship between the magnitude of stress causing deterioration of the catalyst for exhaust gas purification and a representative value indicative of the degree of deterioration of the catalyst.

Further, according to the present invention, there is provided a method of testing the durability of an exhaust gas purification device which creates, on a bench dynamometer, or chassis dynamometer the same state of deterioration of the exhaust gas purification device as if the vehicle were actually market driven. The method of testing durability of an exhaust gas purification device creates a representative driving pattern indicative of the market driving of the vehicle and obtains a time shortened driving pattern. The

2 time-shortened driving pattern is then applied to the catalyst as a stress higher than the stress applied to the catalyst when driving the vehicle by a representative driving pattern. The result of this application is a degree of deterioration of the catalyst at the time when this time-shortened driving pattern is completed which is substantially the same as the degree of deterioration of the catalyst by the representative driving pattern. The amount of stress applied in the method according to the invention is determined from the relationship between the magnitude of stress causing deterioration of the catalyst for exhaust gas purification and a representative value indicative of the degree of deterioration of the catalyst.

BRIEF DESCRIPTION OF THE DRAWINGS

FIGS. 3A and 3B are views explaining the growth of the particle size of platinum Pt;

FIG. 4 is a view of the purification ratios $\phi$ of the exhaust gas;

FIG. 11 is a view explaining the method of raising the stress applied to the catalyst;

BEST MODE FOR USING THE INVENTION

Figure 1:
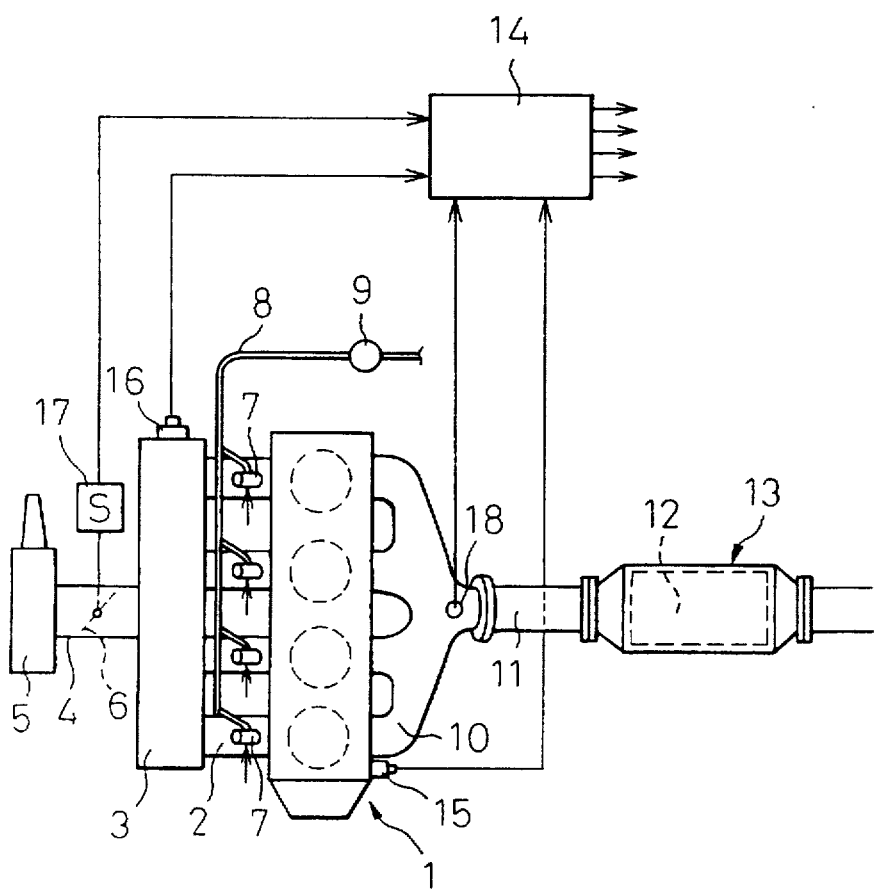
FIG. 1 is an overview of the engine.

Referring to FIG. 1, 1 shows an engine body, 2 intake pipes, 3 a surge tank, 4 an intake duct, 5 an air cleaner, 6 a throttle valve arranged in the intake duct 4, and 7 fuel injectors attached to the intake pipes 2. The fuel injectors 7 have a fuel pipe 8 connected to them. In the fuel pipe 8 is arranged a fuel pump 9. The fuel discharged from the fuel pump 9 is supplied through the fuel pipe 8 to the fuel injectors 7. The fuel is then injected from the fuel injectors 7 toward the intake ports of the corresponding cylinders. On the other hand, the engine body 1 is provided with an exhaust manifold 10. The exhaust manifold 10 is connected through the exhaust pipe 11 to a catalytic converter 13 accommodating a catalyst 12. In the engine shown in FIG. 1, the catalyst 12 is comprised of a three-way catalyst.

The engine shown in FIG. 1 is provided with an electronic control unit 14 housing a computer. The engine is controlled based on the output signals of the electronic control unit 14. As shown in FIG. 1, the engine body 1 has a speed sensor 15 for detecting the engine speed. The output signal of the speed sensor 15 is input to the electronic control unit 14. Further, in the surge tank 3 is arranged a pressure sensor 16 for detecting the absolute pressure in the surge tank 3. The output signal of the pressure sensor 16 is connected to the electronic control unit 14. Further, the throttle valve 6 has mounted on it a throttle sensor 17 for detecting the opening of the throttle valve 6. The output signal of the throttle sensor 17 is input to the electronic control unit 14. Further, in the exhaust manifold 10 is arranged an oxygen concentration sensor 18 for producing an output signal based on the oxygen concentration in the exhaust gas. The output signal of the oxygen concentration sensor 18 is input to the electronic control unit 14. On the other hand, the electronic control unit 14 outputs a fuel injection signal, which fuel injection signal is used to control the fuel injection from the fuel injectors 7.

The three-way catalyst 12 has the function of simultaneously purifying the HC, CO, and $NO_x$ in the exhaust gas when the air-fuel ratio is substantially the stoichiometric air-fuel ratio. Therefore to simultaneously purify the HC, CO, and $NO_x$ in the exhaust gas by the three-way catalyst 12, it is necessary to control the air-fuel ratio to substantially the stoichiometric air-fuel ratio. Therefore, in the engine shown in FIG. 1, an oxygen concentration sensor 18 is arranged in the exhaust manifold 10 and feedback control is performed based on the output signal of the oxygen concentration sensor 18 so that the air-fuel ratio becomes the stoichiometric air-fuel ratio. Specifically, this oxygen concentration sensor 18 is comprised of a cup-shaped tubular body comprised of zirconia. On the inside surface of this tubular body is formed an anode comprised of a thin layer of platinum and on the outside surface of this tubular body is formed a cathode comprised of a thin layer of platinum. The anode formed on the inside surface of the tubular body is exposed to the atmosphere, while the cathode formed on the outside surface of the tubular body is exposed to the exhaust gas. This oxygen concentration sensor 18 generates an output voltage of about 0.1V when the air-fuel ratio is lean and generates an output voltage of about 0.9V when the air-fuel ratio is rich. Therefore, in the engine shown in FIG. 1, when it is judged based on the output of the oxygen concentration sensor 18 that the air-fuel ratio is lean, the amount of the fuel injection is increased, while when it is judged that the air-fuel ratio is rich, the amount of the fuel injection is decreased. Thus, the air-fuel ratio is maintained by feedback control at the stoichiometric air-fuel ratio.

In the engine shown in FIG. 1, normally the air-fuel ratio is maintained at the stoichiometric air-fuel ratio by feedback control, and at the time of engine high load operation, the air-fuel ratio is made rich. During deceleration operation, the fuel injection is stopped. That is, at the time of engine high load operation, the feedback control of the air-fuel ratio is stopped. At this time, the air-fuel ratio is made rich by applying a predetermined ratio to the basic fuel injection amount which is determined from the absolute pressure in the surge tank 3 and the engine speed. On the other hand, when the throttle valve 6 is closed and the deceleration operation is started, if the engine speed is higher than a predetermined fuel cut speed, the fuel injection is stopped. When the engine speed subsequently becomes less than a predetermined fuel supply restart speed, the fuel injection is restarted. When the vehicle is being market driven, the time when the air-fuel ratio is made rich and the time when the fuel injection is stopped are shorter than the time during which the air-fuel ratio is maintained by feedback control at the stoichiometric air-fuel ratio, therefore when the vehicle is being market driven, the time when the air-fuel ratio is maintained by feedback control at the stoichiometric air-fuel ratio becomes the longest.

If the vehicle is used over a long period of time, the exhaust gas purification performance gradually falls. In this case, by determining in advance the target driving distance or target driving time for market driving the vehicle and by measuring the exhaust purification performance after actually market driving the vehicle for this target driving distance or target driving time, the performance of the exhaust gas purification device can be evaluated. Further, in some cases the target driving distance for evaluating the exhaust purification performance is set under the emission controls. For example, the certification tests for emissions in different countries fall under this category. Whatever the case, to evaluate the exhaust purification performance, it is necessary to actually market drive the vehicle for the target driving distance or target driving time. A considerable period of time is taken for this evaluation.

However, as a practical problem, it is difficult to market drive a vehicle for a long period with the intent of evaluating the exhaust purification performance. Therefore, usually a representative driving pattern indicative of the market driving of the vehicle is determined, the vehicle is operated on a chassis dynamometer by this representative driving pattern for a time corresponding to the target driving distance, then, after this operation is finished, the exhaust purification performance is evaluated. However, even when operating a vehicle on a chassis dynamometer in this way, considerable period of time is still required. If a long period is required for evaluating the exhaust purification performance in this way, more time is required for development of the vehicle, therefore there have been strong demands for shortening the time required for evaluation of the exhaust purification performance.

The reason why the exhaust purification performance deteriorates when the vehicle is used over a long period of time is that the elements of the vehicle having an effect on the exhaust purification performance of the exhaust gas purification device deteriorate. Therefore, if it were possible to create in a short time the state of deterioration of the elements of the vehicle similar to the state of deterioration of the elements of the vehicle giving an effect on the exhaust purification performance when the vehicle is market driven for the target driving distance, then it would be possible to shorten the time required for evaluation of the exhaust purification performance. The present invention was made from this viewpoint. Below, the method of creating in a short time the same state of deterioration of the elements of the vehicle as that when the vehicle is market driven will be explained.

First, consider the elements of the vehicle having an effect on the exhaust purification performance when deteriorated. Typical elements of the vehicle are, from the intake side to the exhaust side, the air cleaner 5, the pressure sensor 16, the fuel injectors 7, the intake valves and combustion chambers of the cylinders, the oxygen concentration sensor 18, the three-way catalyst 12, etc. These were studied by experiments and research, whereupon it was found that the elements other than the oxygen concentration sensor 18 and three-way catalyst 12 had almost no effect on the exhaust purification performance and that the decline in the exhaust purification performance was governed by the deterioration of the performance of the oxygen concentration sensor 18 and three-way catalyst 12. Regarding this point, if the performance of the three-way catalyst 12 deteriorates, the exhaust gas purification ratio falls, so the decline in the exhaust purification performance is also governed by the deterioration of the performance of the three-way catalyst 12. On the other hand, if the performance of the oxygen concentration sensor 18 deteriorates, the air-fuel ratio will deviate from the target air-fuel ratio, that is, the stoichiometric air-fuel ratio, so the decline in the exhaust purification performance is governed by the deterioration of the performance of the oxygen concentration sensor 18.

There are many types of oxygen concentration sensors. There are oxygen concentration sensors which will not deteriorate much at all in performance even with long term use, and there are oxygen concentration sensors which will deteriorate in performance when used for a long time. When using as the oxygen concentration sensor 18 an oxygen concentration sensor 18 which will not deteriorate much at all in performance even with long term use, the oxygen concentration sensor 18 will have almost no effect on the exhaust purification performance, therefore in this case the decline in the exhaust purification performance will be governed by the deterioration of the three-way catalyst 12 only.

Next, let us consider what kind of stress is applied to the three-way catalyst 12 to cause the three-way catalyst 12 to deteriorate in performance. As the stress causing deterioration of the performance of the three-way catalyst 12, typical ones are the catalytic bed temperature of the three-way catalyst 12, the oxygen concentration in the exhaust gas, catalyst poisoning contained in the fuel or oil, corrosion caused by rain, snow, or salt, vibration, etc. These were studied by experiments and research, whereupon it was found that stress other than the catalytic bed temperature, the oxygen concentration in the exhaust gas, and poisoning had almost no effect on the deterioration of the performance of the three-way catalyst 12 and that the deterioration of the performance of the three-way catalyst 12 was governed by the catalytic bed temperature, oxygen concentration in the exhaust gas, and poisoning.

That is, if the catalytic bed temperature of the three-way catalyst 12 rises, the sintering of the precious metal in the catalyst is promoted, whereby the deterioration of the performance of the three-way catalyst 12 is accelerated. On the other hand, the precious metal in the catalyst is sometimes: a precious metal where the sintering is accelerated when the oxygen concentration in the exhaust gas becomes higher, that is, a precious metal catalyst where deterioration advances when the oxygen concentration in the exhaust gas becomes higher; a precious metal where the sintering is accelerated when the oxygen concentration in the exhaust gas becomes lower, that is, a precious metal where deterioration advances when the oxygen concentration in the exhaust gas becomes lower; and a precious metal where the deterioration is not accelerated even if the oxygen concentration in the exhaust gas becomes higher or lower. Therefore whether the three-way catalyst 12 deteriorates in performance when the oxygen concentration in the exhaust gas changes depends on the precious metal in the catalyst. Further, the fuel or oil sometimes includes catalyst poisoning which accumulates in the three-way catalyst 12. In this case, the catalyst poisoning gradually covers the active surface of the catalyst, so the three-way catalyst 12 gradually deteriorates in performance along with the elapse of time.

Therefore, when using a precious metal which deteriorates more in performance when the oxygen concentration in the exhaust gas becomes higher or a precious metal which deteriorates more in performance when the oxygen concentration in the exhaust gas becomes lower, and fuel or oil which contains accumulative type catalyst poisoning, as explained above, the deterioration of the performance of the three-way catalyst 12 becomes governed by the catalytic bed temperature, the oxygen concentration of the exhaust gas, and the poisoning. As opposed to this, if there is used a precious metal whose deterioration is not accelerated by a rise or fall in the oxygen concentration in the exhaust gas and the fuel or oil does not contain accumulative type catalyst poisoning, the deterioration of the performance of the three-way catalyst 12 becomes governed by only the catalytic bed temperature.

On the other hand, it was found that the stress causing deterioration of the performance of the oxygen concentration sensor 18 over long term use is comprised of the temperature of the sensor, the oxygen concentration in the exhaust gas, and poisoning. That is, if the temperature of the sensor rises, the sintering of the platinum electrode is accelerated. If the oxygen concentration in the exhaust gas rises, the sintering and peeling of the platinum electrode are accelerated. The peeling of the platinum electrode is accelerated depending on the accumulative type catalyst poisoning, and the porous gas passages of the surface of the sensor are clogged. Therefore, the deterioration of the performance of the oxygen concentration sensor 18 is governed by the temperature of the sensor, the oxygen concentration in the exhaust gas, and the poisoning.

Next, referring to FIG. 2, the exhaust gas purification ratio $\psi$ by the three-way catalyst 12 will be explained. Note that in FIG. 2 the horizontal axis shows the operating time of the engine on a bench dynamometer, and $\psi_1$, $\psi_2$, $\psi_3$, $\psi_4$, and $\psi_5$ show the exhaust gas purification ratio $\psi$ in the case of changing the catalytic bed temperature of the three-way catalyst 12 and the oxygen concentration in the exhaust gas. Further, FIG. 2 shows the case where a precious metal of the three-way catalyst 12 which deteriorates more in performance under a higher oxygen concentration in the exhaust gas is used.

Figure 2:
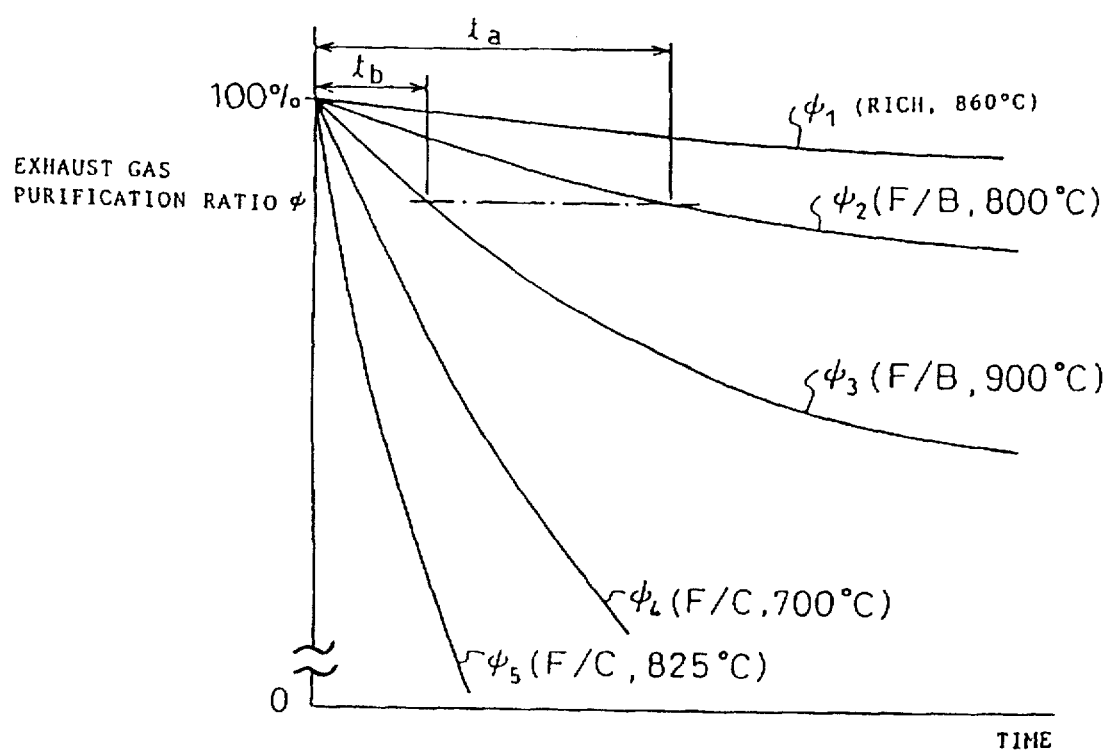
FIG. 2 is a view of the purification ratios $\phi$ of the exhaust gas.

Referring to FIG. 2, $\psi_1$ shows the case where the engine is operated in a steady state where the catalytic bed temperature is maintained at 860° C. while the air-fuel ratio is made rich, $\psi_2$ shows the case where the engine is operated in the steady state where the catalytic bed temperature is maintained at 800° C. while the air-fuel ratio is maintained at the stoichiometric air-fuel ratio by feedback control, $\psi_3$ shows the case where the engine is operated in the steady state where the catalytic bed temperature is maintained at 900° C. while the air-fuel ratio is maintained at the stoichiometric air-fuel ratio by feedback control, $\psi_4$ shows the case where the engine is operated in the steady state where the catalytic bed temperature is maintained at 700° C. while the fuel injection is stopped (fuel cut), and $\psi_5$ shows the case where the engine is operated in the steady state where the catalytic bed temperature is maintained at 825° C. while the fuel injection is stopped.

From the curves $\psi_1$, $\psi_2$, $\psi_3$, $\psi_4$, and $\psi_5$ of FIG. 2, it will be understood that the longer the operating time, the more the purification ratio $\psi$ of the exhaust gas falls. Note that FIG. 2 shows the case of an oxygen concentration sensor 18 which does not deteriorate much in performance at all even with long term use and using fuel and oil not containing accumulative type catalyst poisoning. Therefore, the degree of deterioration of the exhaust gas purification ratio $\psi$ in FIG. 2 shows the degree of deterioration of the three-way catalyst 12. On the other hand, in the case of use of an oxygen concentration sensor which deteriorates in performance when used for a long time, the degree of deterioration of the exhaust gas purification ratio $\psi$ shows the degree of deterioration of the three-way catalyst 12 and oxygen concentration sensor.

In FIG. 2, the curves $\psi_2$ and $\psi_3$ show the cases where the temperatures of the catalytic bed are different, but feedback control is used to maintain the air-fuel ratio at the stoichiometric air-fuel ratio. That is, the curves $\psi_2$ and $\psi_3$ show cases where the oxygen concentration in the exhaust gas is the same. Therefore the difference between the curves $\psi_2$ and $\psi_3$ is due only to the temperature of the catalytic bed. If the temperature of the catalytic bed is increased from 800° C. to 900° C., it is learned that the degree of deterioration ($\psi_2 \rightarrow \psi_3$) becomes larger. Further, this can also be said in the cases shown by the curves $\psi_4$ and $\psi_5$. That is, the difference between the curves $\psi_4$ and $\psi_5$ is also based solely on the difference of the temperature of the catalytic bed. If the temperature of the catalytic bed is increased from 700° C. to 825° C., the degree of deterioration ($\psi_4 \rightarrow \psi_5$) becomes larger.

If the temperature of the catalytic bed is increased in this way, the degree of deterioration of the performance of the catalyst becomes larger and the deterioration of the performance of the three-way catalyst 12 is rapidly accelerated. In other words, to accelerate the deterioration of the performance of the three-way catalyst 12, it is sufficient to make the temperature of the catalytic bed increase. That is, if changing from the operating state shown by the curve $\psi_2$ in FIG. 2 to the operating state shown by the curve $\psi_3$ (if the temperature of the catalytic bed is raised from 800° C. to 900° C.), the operating time until the purification ratio $\psi$ of the exhaust gas falls to a certain purification ratio is shortened from $t_a$ to $t_b$. Therefore, the operating time required for making the performance of the three-way catalyst 12 the same state of deterioration as of the curve $\psi_2$ becomes $t_b/t_a$. If the temperature of the catalytic bed of the three-way catalyst 12 is made higher in this way, the operating time required for obtaining the same state of deterioration of performance of the three-way catalyst 12 can therefore be shortened. The rate of shortening of the operating time becomes $t_b/t_a$.

Next, consider the case where the catalytic bed temperature is maintained at a constant temperature, for example, 800° C., and the oxygen concentration in the exhaust gas is changed, that is, the air-fuel ratio is made rich or the stoichiometric air-fuel ratio or the fuel injection is stopped (fuel cut). In FIG. 2, the case where the catalytic bed temperature is 800° C. and the air-fuel ratio is rich is not shown, but the curve showing this state would be a curve with a further smaller inclination than the curve $\psi_1$. Similarly, in FIG. 2, the case where the catalytic bed temperature is 800° C. and the fuel injection is stopped is not shown, but the curve showing this state would be between the curves $\psi_4$ and $\psi_5$. Therefore, if the catalytic bed temperature is maintained at a constant temperature and the engine operating state is changed from the rich air-fuel ratio state through the stoichiometric air-fuel ratio state to the fuel cut state (if the oxygen concentration in the exhaust gas is increased), it is learned that the degree of deterioration of the performance of the catalyst gradually becomes larger. Therefore, it is also possible to accelerate the deterioration of the performance of the three-way catalyst 12 by increasing the oxygen concentration in the exhaust gas. Therefore, it is possible to shorten the operating time required for obtaining the same state of deterioration of the performance of the three-way catalyst 12.

As shown in FIG. 2, the exhaust gas purification ratios $\psi_1$, $\psi_2$, $\psi_3$, $\psi_4$, and $\psi_5$ fall in a curve along with the elapse of time. Next, this will be explained based on the mechanism of deterioration of the performance of the three-way catalyst 12.

The mechanism of deterioration of the performance of the three-way catalyst 12 has never been completely clarified up until now. However, the present inventors engaged in repeated studies and as a result found that the deterioration of the performance of the three-way catalyst 12 was due to the growth in particle size of the precious metal in accordance with the catalyst temperature and oxygen concentration. Generally speaking, a higher catalyst temperature as well as a higher oxygen concentration unfavorably accelerate the sintering of the particles of the precious metal in the catalyst. This causes the particles to be larger, which deteriorates the catalyst. Next, this will be explained based on the experimental findings shown in FIGS. 3A and 3B. Note that regarding some types of precious metals, the sintering is accelerated under a lower oxygen concentration, but here the explanation will be made taking as an example the case using a precious metal where the sintering is accelerated under a higher oxygen concentration.

FIG. 3A shows the experimental findings measuring the particle size D of the precious metal Pt in the catalyst after maintaining the catalyst temperature for a predetermined time at the temperature T. In other words, FIG. 3A shows the relationship between the amount of growth of the particle size D of the platinum Pt in a predetermined time, that is, the rate of growth dD/dt of the particle size of the platinum Pt, and the catalyst temperature T. From FIG. 3A, the rate of growth dD/dt of the particle size of the platinum Pt is expressed as dD/dt=$A_1$·exp (−B/T) (where, $A_1$ and B are coefficients and T is the absolute temperature of the catalyst). Therefore, it is understood that the rate of growth dD/dt of the particle size of the platinum Pt is expressed in the form of an Arrhenius equation. From these experimental findings, it is understood that the rate of growth dD/dt of the particle size of the platinum Pt increases exponentially as the catalyst temperature T becomes higher.

On the other hand, FIG. 3B shows the findings when measuring the particle size D of the platinum Pt in the catalyst after maintaining the oxygen concentration for a predetermined period at the concentration [$O_2$]. In other words, FIG. 3B shows the relationship between the amount of growth of the particle size D of the platinum Pt in a predetermined time, that is, the rate of growth dD/dt of the particle size of the platinum Pt, and the oxygen concentration [$O_2$]. From FIG. 3B, the rate of growth dD/dt of the particle size of the platinum Pt is expressed by dD/dt=$A_2$·[$O_2$]$^\alpha$ (where, $A_2$ and $\alpha$ are coefficients). Therefore, from these experimental findings it is learned that the rate of growth dD/dt of the particle size of the platinum Pt increases along with a higher oxygen concentration [$O_2$].

In this way, it is also possible to express the rate of growth dD/dt of the particle size of the platinum Pt based on the oxygen concentration [$O_2$] as a function of only the oxygen concentration [$O_2$]. In some more detail, however, the rate of growth dD/dt of the particle size of the platinum Pt is influenced by the reduction in the sum of the surface area of all of the platinum Pt. That is, even if the platinum Pt grows in its particle size, the volume of all of the platinum Pt in the catalyst does not change, so if the particle size of the platinum Pt becomes larger, the number of particles of the platinum Pt becomes smaller. As a result, the sum of the surface area of all of the platinum Pt falls. However, the growth in particle size of the platinum Pt due to the oxygen is caused by the attack of the oxygen on the surface of the platinum Pt particles. The total attack force of the oxygen on all of the platinum Pt falls along with a decrease of the sum of the surface area of the platinum Pt particles. If the total attack force of the oxygen on all of the platinum Pt falls, the rate of growth of the particle size of the platinum Pt particles falls.

Next, if considering the sum of the surface area of all of the platinum Pt, when the platinum Pt grows in its particle size, the surface area of the platinum Pt increases in proportion to the square of the particle size D. On the other hand, at this time, the volume of the platinum Pt increases in proportion to the cube of the particle size D, so the number of particles of the platinum Pt falls in inverse proportion to the cube of the particle size D. That is, if the platinum Pt grows in its particle size, the surface area of the platinum Pt increases in proportion to the square of the particle size D. At this time, since the number of particles of the platinum Pt falls in inverse proportion to the cube of the particle size D, the sum of the surface area of all of the platinum Pt falls in inverse proportion to the particle size D.

Therefore if taking into consideration the fact that the sum of the surface area of all of the platinum Pt falls in inverse proportion to the particle size D, the rate of growth $dD/dt$ of the particle size of the platinum at the oxygen concentration $|O_2|$ is expressed as $dD/dt=A_3 \cdot (1/D) \cdot |O_2|^\alpha$. Here, $A_3$ is a coefficient.

Therefore, the rate of growth $dD/dt$ of the particle size of the platinum Pt in the catalyst after the catalyst is maintained for a predetermined time at the temperature T and at the oxygen concentration $[O_2]$ is expressed by the following equation, that is, as a product of $A_1 \cdot \exp(-B/T)$ and $A_3 \cdot (1/D) \cdot |O_2|^\alpha$:

$$dD/dt = A \cdot (1/D) \cdot \exp(-B/T) \cdot [O_2]^\alpha$$

Here, $A (=A_1 \cdot A_3)$ is a coefficient. Next, when $(1/D)$ on the right side is moved to the left side, the above equation becomes as follows:

$$D \cdot dD/dt = A \cdot \exp(-B/T) \cdot |O_2|^\alpha$$

$$\tfrac{1}{2} \cdot dD^2/dt = A \cdot \exp(-B/T) \cdot [O_2]^\alpha$$

Next, the above equation becomes the following equation if integrated by the time t:

$$D^2 = 2A \cdot \exp(-B/T) \cdot [O_2]^\alpha \cdot t$$

$$D = (2A)^{1/2} \cdot \exp(-B/2T) \cdot [O_2]^{\alpha/2} \cdot t^{1/2}$$

Here, if $(2A)^{1/2}$ is rewritten as A, $B/2$ is rewritten as B, and $\alpha/2$ is rewritten as $\alpha$, the above equation becomes as follows:

$$D = A \cdot \exp(-B/T) \cdot [O_2]^\alpha \cdot t^{1/2}$$

Here, t shows the engine operating time, therefore, as shown in the above equation, the particle size D of the platinum Pt in the catalyst becomes proportional to the (½) power of the operating time. The particle size D of the platinum Pt in the catalyst becomes proportional to the (½) power of the operating time t because as mentioned earlier the presumption is that the sum of the surface area of the platinum Pt falls in inverse proportion to the particle size D along with the elapse of time. However, the surface area of the platinum Pt actually falls through a complicated process. The sum of the surface area of the platinum Pt does not necessarily accurately fall in inverse proportion to the particle size D. If the sum of the surface area of the platinum Pt does not accurately fall in inverse proportion to the particle size D, it is confirmed that the particle size D is proportional to the m power of the operating time t (m being a positive number smaller than 1.0) and therefore the general equation expressing the particle size D of the platinum Pt becomes as follows:

$$D = A \cdot \exp(-B/T) \cdot |O_2|^\alpha \cdot t^m$$

As shown in this general equation, the particle size D of the platinum Pt becomes a function of the catalyst temperature T, oxygen concentration $|O_2|$, and operating time t. Here, if the platinum grows in its particle size D, the catalytic function deteriorates, so the purification ratio $\psi$ of the exhaust gas declines. But in this case it is learned from experimental findings that the degree of decline of the purification ratio $\psi$ of the exhaust gas is exactly proportional to the rate of growth in particle size of the platinum Pt. That is, if the initial particle size of the platinum Pt is $D_0$ and the initial exhaust gas purification ratio is $\psi_0$, it is learned that the following relationship stands:

$$(\psi_0 - \psi)/\psi_0 = D/D_0$$

If the above equation is rewritten, the purification ratio $\psi$ of the exhaust gas becomes as follows:

$$\psi = \psi_0 - (\psi_0/D_0) \cdot A \cdot \exp(-B/T) \cdot |O_2|^\alpha \cdot t^m$$

Here, if $(\psi_0/D_0) \cdot A$ is rewritten as A, the above equation becomes as follows:

$$\psi = \psi_0 - A \cdot \exp(-B/T) \cdot [O_2]^\alpha \cdot t^m$$

FIG. 2 shows the relationship between the purification ratio $\psi$ of the exhaust gas and the operating time t in the case of changing in various ways the catalyst temperature T and oxygen concentration $[O_2]$ in the above equation. As shown in FIG. 2, the rate of decline of the purification ratio $\psi$ of the exhaust gas gradually becomes smaller with a longer operating time t.

In this way, strictly speaking, the purification ratio $\psi$ of the exhaust gas changes as shown in FIG. 2, but in practice it is possible to use an approximation equation which deems the rate of particle growth of the platinum Pt to be constant regardless of the operating time t. In this approximation equation, since m is deemed to be m=1, in the formula showing the above purification ratio $\psi$ of the exhaust gas, the purification ratio $\psi$ of the exhaust gas can be expressed as follows:

$$\psi = \psi_0 - A \cdot \exp(-B/T) \cdot |O_2|^\alpha \cdot t$$

As will be understood from the above equation, if this approximation equation is used, the purification ratio $\psi$ of the exhaust gas falls linearly along with the elapse of the operating time. Note that in this approximation equation, the coefficients A, B, and $\alpha$ are found from experiments. In FIG. 4, the black dots show the experimental values at the time of changing the temperature of the three-way catalyst 12 and oxygen concentration in the exhaust gas. The straight lines $\psi_1$, $\psi_2$, $\psi_3$, $\psi_4$, and $\psi_5$ in FIG. 4 show the purification ratios of the exhaust gas calculated by the above approximation equation using the coefficients A, B, and $\alpha$ obtained from these experimental values. As will be understood from FIG. 4, the lines $\psi_1$, $\psi_2$, $\psi_3$, $\psi_4$, and $\psi_5$ obtained from the above-mentioned approximation equation substantially match the experimental values at the corresponding catalyst temperatures and oxygen concentrations, therefore it is learned that the approximation equation suitably expresses the change of the purification ratio $\psi$ of the exhaust gas.

Note that in FIG. 4, the operating conditions (rich, 860° C., etc.) for the lines $\psi_1$, $\psi_2$, $\psi_3$, $\psi_4$, and $\psi_5$ are the same as the operating conditions for the corresponding curves $\psi_1$, $\psi_2$, $\psi_3$, $\psi_4$, and $\psi_5$ of FIG. 2. That is, in FIG. 4, $\psi_1$ shows the case where the engine is operated in the steady state where the catalytic bed temperature is maintained at 860° C. while the air-fuel ratio is made rich, $\psi_2$ shows the case where the engine is operated in the steady state where the catalytic bed temperature is maintained at 800° C. while the air-fuel ratio is maintained at the stoichiometric air-fuel ratio by feedback control, $\psi_3$ shows the case where the engine is operated in the steady state where the catalytic bed temperature is maintained at 900° C. while the air-fuel ratio is maintained at the stoichiometric air-fuel ratio by feedback control, $\psi_4$ shows the case where the engine is operated in the steady state where the catalytic bed temperature is maintained at 700° C. while the fuel injection is stopped, and $\psi_5$ shows the case where the engine is operated in the steady state where the catalytic bed temperature is maintained at 825° C. while the fuel injection is stopped. Further, FIG. 4 shows the case, similar to the case shown in FIG. 2, where a precious metal which deteriorates more in performance with a higher oxygen concentration in the exhaust gas is used as the precious metal of the three-way catalyst 12.

When the rate of particle growth of the platinum Pt is deemed to be constant regardless of the operating time t, $\psi_1$, $\psi_2$, $\psi_3$, $\psi_4$, and $\psi_5$ are expressed with straight lines as shown in FIG. 4. In this case, the inclinations of the lines $\psi_1$, $\psi_2$, $\psi_3$, $\psi_4$, and $\psi_5$ indicate the rates of deterioration of the exhaust gas purification ratio $\psi$. Note that FIG. 4 shows the case using an oxygen concentration sensor 18 which will not deteriorate much in performance at all even with long term use and using fuel and oil not containing any accumulative type catalyst poisoning. Therefore, the rate of decline of the exhaust gas purification ratio $\psi$ shows the rate of deterioration of performance of the three-way catalyst 12. Therefore, hereinafter, the inclination ($-d\psi/dt$) of the lines $\psi_1$, $\psi_2$, $\psi_3$, $\psi_4$, and $\psi_5$ of FIG. 4 will be referred to as the rate of deterioration K. Note that as the rate of deterioration K becomes faster, the degree of deterioration of the catalyst becomes larger, so the rate of deterioration K expresses the degree of deterioration of the catalyst.

Note that by differentiating the approximation equation ($\psi=\psi_0-A\cdot\exp(-B/T)\cdot[O_2]^\alpha\cdot t$) by time, the inclination ($-d\psi/dt$) of the lines $\psi_1$, $\psi_2$, $\psi_3$, $\psi_4$, and $\psi_5$ is obtained as the following equation:

$$-d\psi/dt = A\cdot\exp(-B/T)\cdot[O_2]^\alpha$$

Therefore, the rate of deterioration K becomes a function of the catalyst temperature T and oxygen concentration $[O_2]$ as shown by the following equation:

$$K=-d\psi/dt=A\cdot\exp(-B/T)\cdot[O_2]^\alpha$$

Next, the method of shortening the operating time required for obtaining the same degree of deterioration of the three-way catalyst 12 as that obtained using the rate of deterioration K, that is, the rate of deterioration K obtained from the approximation equation, will be first explained.

In FIG. 4, the lines $\psi_2$ and $\psi_3$ show the cases where the temperatures of the catalytic bed differ, but the air-fuel ratio is maintained at the stoichiometric air-fuel ratio by feedback control. That is, the lines $\psi_2$ and $\psi_3$ show cases where the oxygen concentration in the exhaust gas is the same. Therefore, the difference between the lines $\psi_2$ and $\psi_3$ is based only on the difference of the temperature of the catalytic bed. If the temperature of the catalytic bed is increased from 800° C. to 900° C. ($\psi_2\rightarrow\psi_3$), it is learned that the rate of deterioration K becomes larger. Further, this may be applied to the lines $\psi_4$ and $\psi_5$ as well. That is, the difference between the lines $\psi_4$ and $\psi_5$ is also based solely on the temperature of the catalytic bed. If the temperature of the catalytic bed is raised from 700° C. to 825° C. ($\psi_4\rightarrow\psi_5$), the rate of deterioration K becomes larger.

If the temperature of the catalytic bed is increased in this way, the rate of deterioration K becomes larger and therefore the deterioration of the performance of the three-way catalyst 12 proceeds rapidly. In other words, to accelerate the deterioration of the performance of the three-way catalyst 12, it is sufficient to increase the temperature of the catalytic bed. That is, if the rates of deterioration at the time of the operating states shown by the lines $\psi_1$, $\psi_2$, $\psi_3$, $\psi_4$, and $\psi_5$ in FIG. 4 are $K_1$, $K_2$, $K_3$, $K_4$, and $K_5$, respectively, when changing from the operating state shown by the line $\psi_2$ to that of the line $\psi_3$, that is, if the temperature of the catalytic bed is raised from 800° C. to 900° C., the rate of deterioration of the performance of the three-way catalyst 12 becomes a factor of $K_3/K_2$ ($K_3/K_2>1.0$). Therefore the time required for making the performance of the three-way catalyst 12 the same state of deterioration as that of the operating state shown by the line $\psi_2$ becomes a factor of $K_2/K_3$ ($K_2/K_3<1.0$). If the temperature of the catalytic bed of the three-way catalyst 12 is raised in this way, it becomes possible to shorten the operating time required for obtaining the same state of deterioration of the performance of the three-way catalyst 12. The rate of shortening of the operating time is $K_2/K_3$: the ratio between the rate of deterioration $K_2$ at the low catalytic bed temperature and the rate of deterioration $K_3$ at the high catalytic bed temperature.

In this way, the rate of shortening of the operating time required for obtaining the same state of deterioration of performance of the three-way catalyst 12 is expressed by the ratio of the rate of deterioration K at the low catalytic bed temperature to the rate of deterioration K at the high catalytic bed temperature. Therefore, by finding by experiments the rates of deterioration K for various catalytic bed temperatures, the rate of shortening of the operating time can be immediately determined for various methods of raising the catalytic bed temperature.

Next, consider the case where the catalytic bed temperature is maintained at a constant temperature, for example, 800° C., and the oxygen concentration in the exhaust gas is changed, that is, the case where the air-fuel ratio is made rich or the stoichiometric air-fuel ratio or the fuel injection is stopped. In FIG. 4, the case where the catalytic bed temperature is 800° C. and the air-fuel ratio is rich is not shown, but the line showing this state will have a smaller inclination than the line $\psi_1$. Similarly, in FIG. 4, the case where the catalytic bed temperature is 800° C. and the fuel injection is stopped is not shown, but the line showing this state would be between the lines $\psi_4$ and $\psi_5$. Therefore if the catalytic bed temperature is kept at a constant temperature and the engine operating state is changed from a rich air-fuel ratio state through a stoichiometric air-fuel ratio state to a fuel cut state, that is, if the oxygen concentration in the exhaust gas is increased, it is learned that the rate of deterioration K gradually becomes larger. Therefore it is possible to accelerate the deterioration of the performance of the three-way catalyst 12 by increasing the oxygen concentration in the exhaust gas. The rate of shortening of the operating time required for obtaining the same state of deterioration of performance of the three-way catalyst 12 is the ratio of the rate of deterioration K at the low oxygen concentration in the exhaust gas to the rate of deterioration K at the high oxygen concentration in the exhaust gas.

In this way, by raising the catalytic bed temperature or increasing the oxygen concentration in the exhaust gas, it is possible to accelerate the deterioration of the performance of the three-way catalyst 12. The rate of acceleration and the rate of shortening of the operating time are found from the rate of deterioration K.

As mentioned earlier, the rate of deterioration K is expressed by the following equation:

$$K = A \cdot \exp(-B/T) \cdot |O_2|^\alpha$$

Here, if the coefficients A and B are shown by $C_1$ and $C_2$, respectively, and if the logarithms of both sides are taken, the above equation is expressed as follows:

$$\ln K = C_1 - C_2 \cdot (1/T) + \alpha \ln |O_2|$$

In the above way, the rate of deterioration K is used for finding the rate of acceleration of the deterioration of performance of the catalyst, therefore below the above equation will be called an acceleration formula. Here, $C_1$, $C_2$, and $\alpha$ are coefficients which are determined based on experimental values. Note that as mentioned earlier FIG. 4 shows the case where as the precious metal of the three-way catalyst 12, a precious metal which deteriorates in performance more with a higher oxygen concentration in the exhaust gas is used. In this case, the above-mentioned coefficient $\alpha$ is made a positive value. As opposed to this, when a precious metal which deteriorates more in performance with a lower oxygen concentration in the exhaust gas is used, the coefficient $\alpha$ is made a negative value.

Figure 5A:
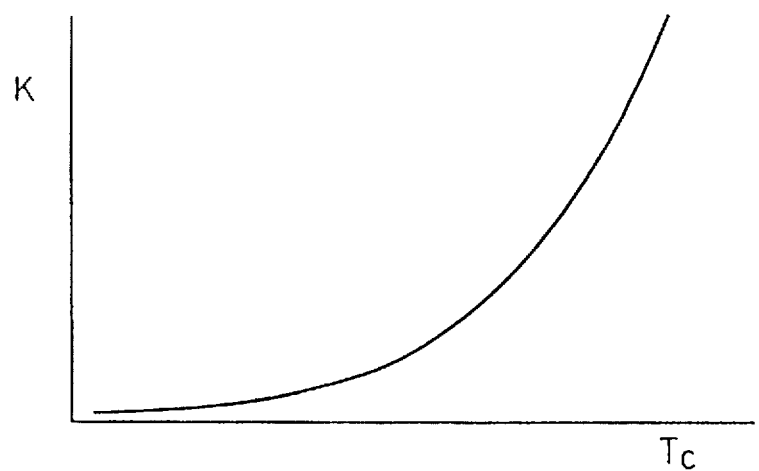
FIGS. 5A and 5B are views of the rate of deterioration K.
Figure 5B:
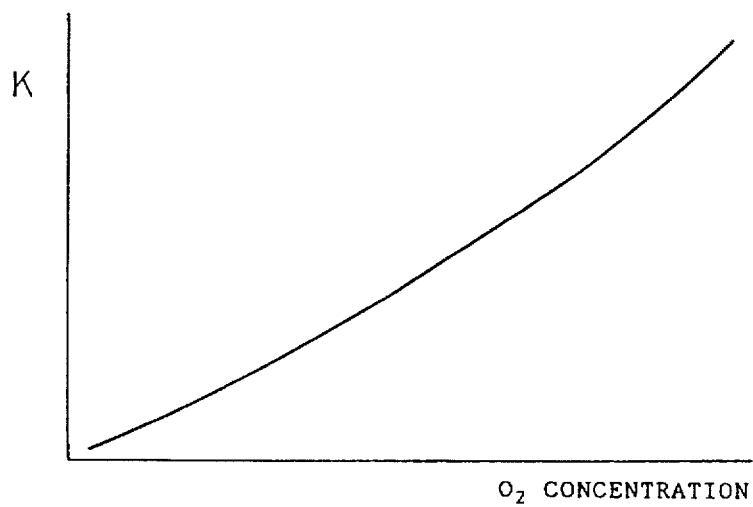
Figure 6:
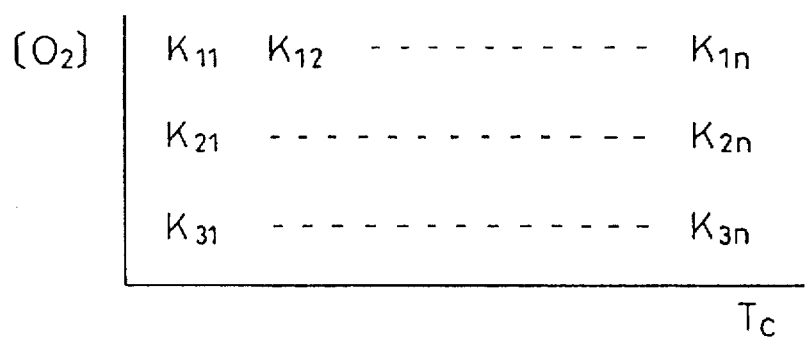
FIG. 6 is a view of a map of the rate of deterioration K.

FIG. 5A shows the rate of deterioration K calculated based on the acceleration equation and catalyst temperature, that is, the relationship with the catalytic bed temperature $T_c$, while FIG. 5B shows the relationship between the rate of deterioration K calculated based on the acceleration equation and the oxygen concentration $[O_2]$ in the exhaust gas. As shown in FIG. 5A, it will be understood that when the catalytic bed temperature $T_c$ rises, the rate of deterioration K increases exponentially. FIG. 6 shows the relationship shown in FIGS. 5A and 5B in the form of a map; $K_{11} \ldots K_{1n}$ when the fuel injection has been stopped; $K_{21} \ldots K_{2n}$ when the air-fuel ratio is maintained at the stoichiometric air-fuel ratio by feedback control; and $K_{31} \ldots K_{3n}$ when the air-fuel ratio is rich.

In FIG. 6, when feedback control is being performed, by raising the catalytic bed temperature $T_c$ from for example the catalytic bed temperature corresponding to $K_{21}$ to the catalytic bed temperature corresponding to $K_{2n}$, it is possible to obtain the same state of deterioration of the three-way catalyst within the engine operating time of a factor of $K_{21}/K_{2n}$ ($K_{21}/K_{2n} < 1.0$). This is the basic idea of the present invention.

Figure 7:
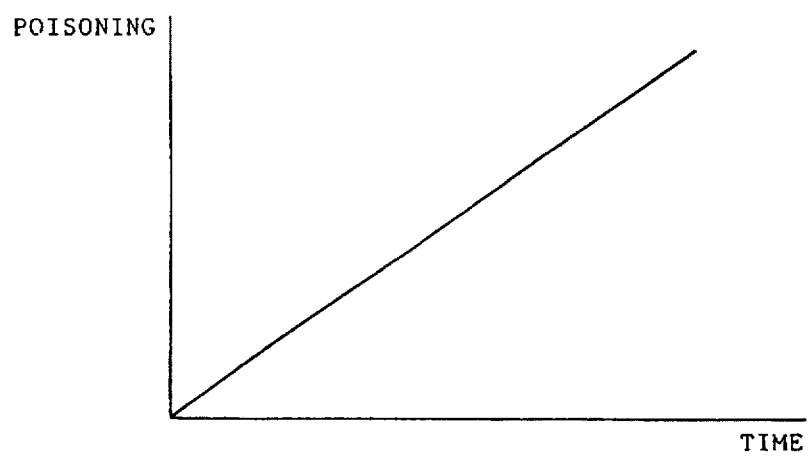
FIG. 7 is a view of the amount of poisoning of the catalyst.

Note that the usually used fuel or oil in some cases includes catalyst poisoning which accumulates in the three-way catalyst 12 along with time as shown in FIG. 7. In this case, for example, when raising the catalytic bed temperature $T_c$ from the catalytic bed temperature corresponding to $K_{21}$ to the catalytic bed temperature corresponding to $K_{2n}$, the total amount of the catalyst poisoning accumulated in the three-way catalyst 12 when operated at the catalytic bed temperature corresponding to $K_{21}$ is supplied in the shortened operating time where the engine or vehicle is operated at the catalytic bed temperature corresponding to $K_{2n}$.

Figure 8:
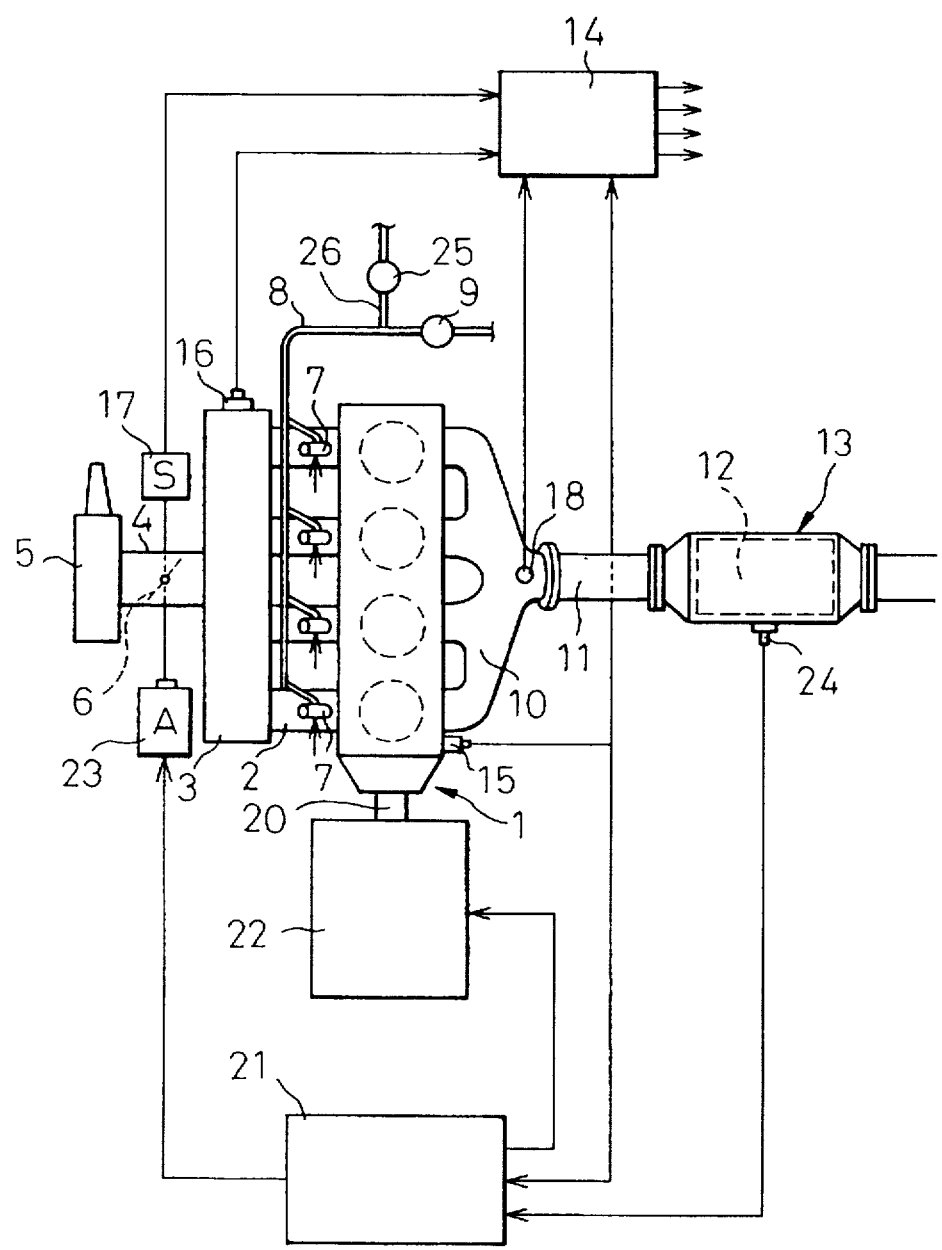
FIG. 8 is an overview of a durability test apparatus.

Next, an example of the method of testing durability in which the present invention is applied will be explained in detail. FIG. 8 shows the case of performing a durability test on an engine on a bench dynamometer. Referring to FIG. 8, the output shaft 20 of the engine is connected to a dynamometer 22 controlled by the control device 21. Further, the throttle valve 6 has an actuator 23 for driving the throttle valve 6. This actuator 23 is controlled by the control device 21. Further, the catalytic converter 13 has a temperature sensor 24 for detecting the catalytic bed temperature of the three-way catalyst 12. The output signal of the temperature sensor 24 and the output signal of the speed sensor 15 are input to the control device 21. Further, the fuel pipe 8 has connected to it a catalyst poisoning pipe 26 provided with a pump 25 for supplying the accumulative type catalyst poisoning.

Figure 9:
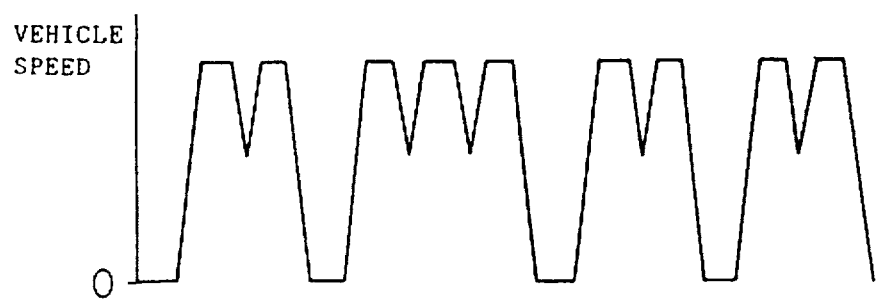
FIG. 9 is a view of a representative driving pattern.

In the method of testing durability, first a representative driving pattern indicative of the market driving of the vehicle is found. FIG. 9 shows an example of a representative driving pattern. This representative driving pattern is determined so that when an engine is operated on a bench dynamometer by this representative driving pattern, the exhaust purification performance will decline equal to or lower than that in the case of the vehicle being actually driven by a certain target driving distance. Note that this representative driving pattern is determined so that the operation will end in a time shorter than the time required for the vehicle to actually drive the target driving distance.

Figure 10:
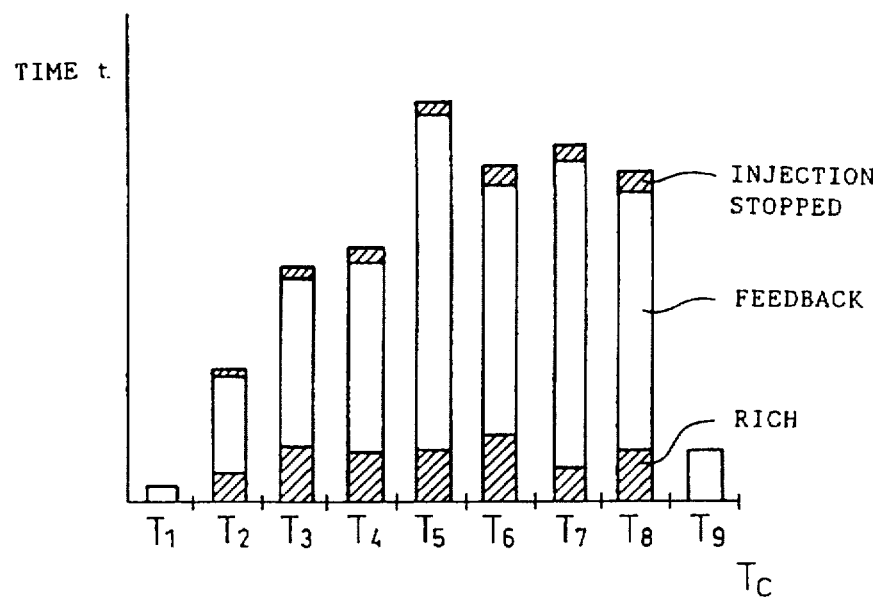
FIG. 10 is a view of the driving states classified by the catalytic bed temperature.

Next, in the representative driving pattern, the time the air-fuel ratio is made rich, the time when the air-fuel ratio is maintained at the stoichiometric air-fuel ratio by feedback control, and the time when the fuel injection is stopped are calculated for every predetermined temperature range of the catalytic bed. The results of the calculation are shown in FIG. 10. Note that in FIG. 10, the lower hatching portion shows the time that the air-fuel ratio is made rich, the upper hatching portion shows the time when the injection is stopped, and the nonhatched portion shows the time during which the air-fuel ratio is made the stoichiometric air-fuel ratio by feedback control. Further, $T_1, T_2, \ldots T_9$ show representative temperatures in the ranges of the catalytic bed temperatures $T_c$.

Next, the catalytic bed temperature is raised only when feedback control is being performed so as to raise the stress applied to the three-way catalyst 12. This will also be explained with reference to FIGS. 11(A) to (H). Note that FIG. 11(A) is completely the same as FIG. 10. First, the time when the air-fuel ratio is made rich, the time when the air-fuel ratio is maintained at the stoichiometric air-fuel ratio by feedback control, and the time when the fuel injection is stopped shown in FIG. 11(A) are divided as shown in FIGS. 11(B), (C), and (D). Therefore, FIG. 11(B) shows the time the air-fuel ratio is made rich, FIG. 11(C) shows the time when the air-fuel ratio is maintained at the stoichiometric air-fuel ratio by feedback control, and FIG. 11(D) shows the time when the fuel injection is stopped.

Next, the catalytic bed temperature is raised under the feedback control shown in FIG. 11(C). That is, if the rates of deterioration corresponding to the representative temperatures $T_1, T_2 \ldots T_9$ of the catalyst bed under feedback control are $K_1, K_2 \ldots K_9$, in the operating state at a representative temperature $T_1$, the catalytic bed temperature is raised to $T_9$ and the time obtained by multiplying the operating time at the representative temperature $T_1$ by $K_1/K_9$ is added to the operating time at the catalytic bed temperature $T_9$. Further, in the feedback operating state of the representative temperature $T_2$ as well, the catalytic bed temperature is raised to $T_9$ and the time obtained by multiplying the feedback operating time at the representative temperature $T_2$ by $K_2/K_9$ is further added to the operating time at the catalytic bed temperature $T_9$. Similarly, in the feedback operating states of the remaining representative temperature $T_3$, $T_4$, $T_5$, $T_6$, $T_7$, and $T_8$, the catalyst temperature is raised to $T_9$ and the times obtained by multiplying the feedback control times at the representative temperatures $T_3$, $T_4$, $T_5$, $T_6$, $T_7$, and $T_8$ with $K_3/K_9$, $K_4/K_9$, $K_5/K_9$, $K_6/K_9$, $K_7/K_9$, and $K_8/K_9$, respectively, are added to the operating time at the catalytic bed temperature $T_9$.

In this way, during feedback control, the catalytic bed temperatures in all of the operating states are raised to the highest catalytic bed temperature $T_9$. The operating time at this time is shown in FIG. 11(G). As will be understood from a comparison of FIG. 11(C) with FIG. 11(G), if the catalytic bed temperature in all of the operating states is raised to $T_9$, the operating time will be greatly shortened. Note that in this case the temperature to be raised to may be higher than $T_9$, but if made too high, the catalyst will melt, so it cannot be made that high.

Figure 12:
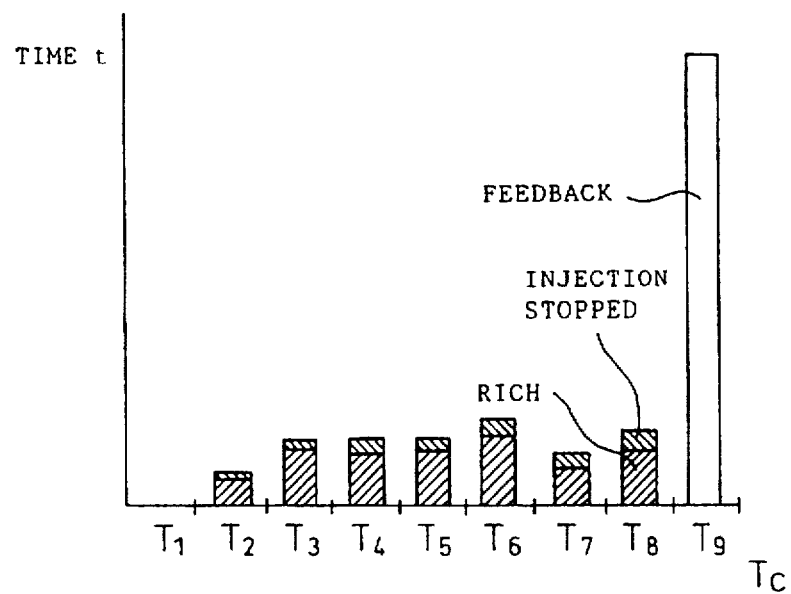
FIG. 12 is a view of the driving states in accordance with the catalytic bed temperature when the stress is increased.

Note that the rich operating state shown in FIG. 11(B) is maintained as it is as shown in FIG. 11(F) and the fuel cut state shown in FIG. 11(D) is maintained as it is as shown in FIG. 11(H). The driving states shown in FIGS. 11(F), (G), (H) are put together as shown in FIG. 11(E). An enlargement of this figure is given in FIG. 12. As shown in FIG. 12, in the range of the catalytic bed temperatures of $T_2$ to $T_8$, the rich operation and fuel cut alone are repeated, while when the catalytic bed temperature is $T_9$, feedback control is performed.

Figure 13:
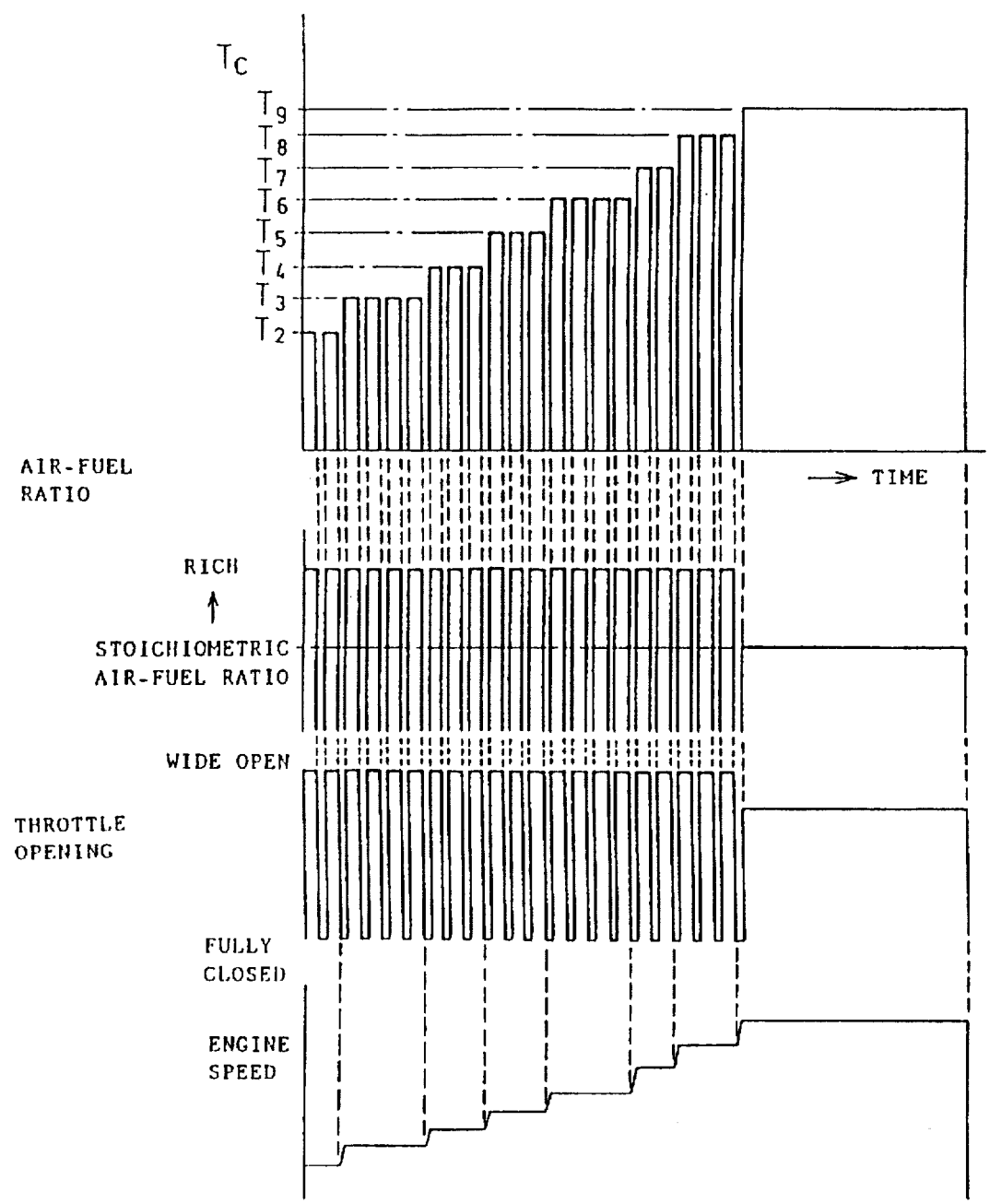
FIG. 13 is a view of a time shortened driving pattern.

FIG. 13 shows the time-shortened (reduced) driving pattern for performing the operating state for exactly the time shown in FIG. 12. As shown in FIG. 13, first, the catalytic bed temperature is made $T_2$ and a rich operation and fuel cut are repeated, then the catalytic bed temperature is raised to $T_3$ and a rich operation and fuel cut are repeated. Similarly, the catalytic bed temperature is raised to $T_8$ and a rich operation and fuel cut are repeated at the catalytic bed temperatures $T_4$, $T_5$, $T_6$, $T_7$, and $T_8$. Note that the rich operating time and fuel cut time at the catalytic bed temperatures $T_2$, $T_3$, $T_4$, $T_5$, $T_6$, $T_7$, and $T_8$ match the corresponding times shown in FIG. 12. Next, the catalytic bed temperature is raised to $T_9$ and feedback control is performed for exactly the time shown in FIG. 12.

Note that the time-shortened driving pattern shown in FIG. 13 is just an example and that various patterns may be used. For example, it is possible to first perform feedback control and then repeat a rich operation and fuel cut while gradually reducing the catalytic bed temperature.

Next, the method of operating the engine on a bench dynamometer by the time-shortened driving pattern shown in FIG. 13 will be briefly explained. As shown in FIG. 13, when the air-fuel ratio should be made rich, the actuator 23 (FIG. 8) is used to make the throttle valve 6 open fully. When the throttle valve 6 is made to open fully, the air-fuel ratio is made rich by the output signal from the electronic control unit 14. On the other hand, when the fuel injection should be stopped, the throttle valve 6 is made to close. At this time, since the engine speed has become higher than the fuel cut speed, the injection is stopped by the output signal from the electronic control unit 14. Further, during feedback control, the air-fuel ratio is maintained at the stoichiometric air-fuel ratio by the output signal of the oxygen concentration sensor 18.

On the other hand, the catalytic bed temperature $T_c$ becomes higher with a higher engine speed and the engine speed required for making the catalytic bed temperature $T_c$ the target temperature is found in advance. Therefore the dynamometer 22 is controlled so that the engine speed becomes the predetermined speed. Note that as shown in FIG. 8 it is possible to control the dynamometer 22 based on the output signal of the temperature sensor 24 so that the catalytic bed temperature Tc becomes the target temperature.

Further, while the vehicle is being driven on the bench dynamometer by the time-shortened driving pattern, accumulative type catalyst poisoning is supplied from the catalyst poisoning pipe 26 to the fuel pipe 8. The total supply of the catalyst poisoning at this time matches with the total supply of the catalyst poisoning when driving at the representative driving pattern shown in FIG. 9.

When performing feedback control, the air-fuel ratio is stable, therefore as mentioned earlier the catalytic bed temperature $T_c$ is made to increase only when performing feedback control. However, in FIG. 12, the catalytic bed temperatures $T_2$, $T_3$, $T_4$, $T_5$, $T_6$, and $T_7$ of the rich operation and fuel cut state can also be raised to, for example, $T_8$. Further, while the explanation up until now was made with reference to driving an engine on a bench dynamometer, the present invention can of course also be applied to the case of driving a vehicle on a chassis dynamometer.

Next, the method of shortening the operating time based on the strictly found purification ratio $\psi$ of the exhaust gas will be briefly explained. In this case as well, as shown in FIG. 10, first the time in the representative driving pattern shown in FIG. 9 when the air-fuel ratio is made rich, the time when the air-fuel ratio is maintained at the stoichiometric air-fuel ratio by feedback control, and the time the fuel injection is stopped are calculated for each of the predetermined temperature ranges of the catalytic bed $T_1$, $T_2$, $T_3$, $T_4$, $T_5$, $T_6$, $T_7$, $T_8$, and $T_9$.

Next, as shown in FIGS. 11(C) and (G), the feedback control times in the catalytic bed temperature ranges from $T_1$ to $T_8$ are shortened to the feedback control time in the catalytic bed temperature range $T_9$ and added. On the other hand, as shown in FIGS. 11(B) and (F), the rich operating state is maintained as it is and, as shown in FIGS. 11(D) and (H), the fuel cut state is also maintained as it is. Next, the engine is operated by the time-shortened driving pattern shown in FIG. 13 in accordance with the rich operating time, fuel cut time, and feedback control time shown in FIG. 12.

Even when shortening the operating time based on this strictly found purification ratio $\psi$ of the exhaust gas, it is attempted to shorten just the feedback control time. However, in this case, the purification ratio $\psi$ of the exhaust gas forms a curve, so it is not possible to shorten the feedback control time simply by multiplying the feedback control time with the rate of deterioration K as when using the approximation equation and it is necessary to shorten the feedback control time by another method. Next, this will be explained with reference to FIG. 14.

The above mentioned strictly found purification ratio $\psi$ of the exhaust gas is expressed by the following equation:

$$\psi = \psi_0 - A \cdot \exp(-B/T) \cdot [O_2]^{\alpha} \cdot t^m$$

Figure 14:
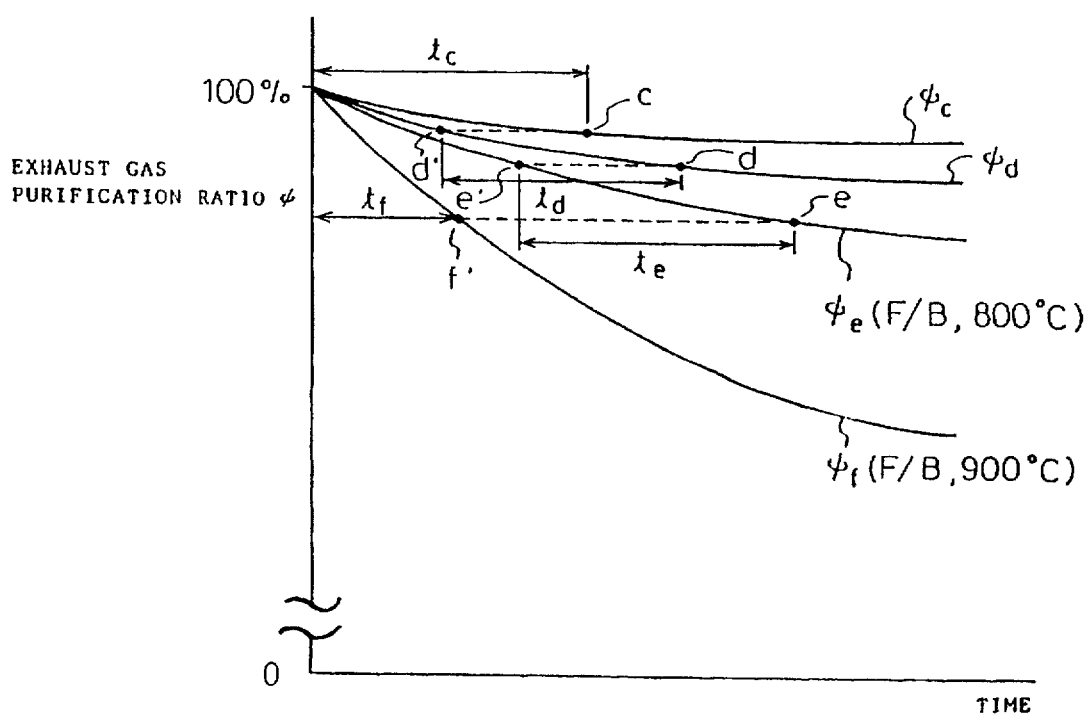
FIG. 14 is a view of the purification ratios $\phi$ of the exhaust gas.

Here, the coefficients A, B, $\alpha$, and m are obtained from actually measured values. In FIG. 14, $\psi_c$, $\psi_d$, $\psi_e$, and $\psi_f$ show the purification ratios of the exhaust gas during feedback control calculated based on the above equation. The catalyst temperature T when these purification ratios are given becomes gradually higher in the order of $\psi_c$, $\psi_d$, $\psi_e$, and $\psi_f$. Note that $\psi_f$ in FIG. 14 corresponds to $\psi_3$ in FIG. 2, and $\psi_e$ in FIG. 14 corresponds to $\psi_2$ in FIG. 2. Curves corresponding to $\psi_c$ and $\psi_d$ in FIG. 14 are not given in FIG. 2.

As shown in FIG. 10, for example, when the temperature range of the catalytic bed is divided into the nine regions of $T_1$, $T_2$, $T_3$, $T_4$, $T_5$, $T_6$, $T_7$, $T_8$, and $T_9$, nine curves showing the purification ratios $\psi$ corresponding to the regions are calculated. FIG. 14 is drawn just for explaining the method of shortening the feedback control time, therefore FIG. 14 shows only four representative curves $\psi_c$, $\psi_d$, $\psi_e$, and $\psi_f$.

FIG. 14 shows the method of finding the shortened operating time when the feedback control operation shown by $\psi_c$ is performed for the time $t_c$, the feedback control operation shown by $\psi_d$ is performed for the time $t_d$, and the feedback control operation shown by $\psi_e$ is performed for the time $t_e$ and raising the catalyst temperature T at the time when the feedback control operations shown by $\psi_c$, $\psi_d$, and $\psi_e$ are being performed to the catalyst temperature T at the time when the feedback control operation shown by $\psi_f$ is being performed.

If the feedback control operation shown in $\psi_c$ in FIG. 14 is performed for the time $t_c$, the purification ratio $\psi$ of the exhaust gas falls to the point c on the curve $\psi_C$. Next, if the feedback control operation shown by $\psi_d$ is started, the purification ratio starts to fall from the point d' on the curve $\psi_d$ of the same purification ratio $\psi$ as the point c. Next, if the feedback control operation shown by $\psi_d$ is performed for the time $t_d$, the purification ratio $\psi$ of the exhaust gas falls to the point d on the curve $\psi_d$. Next, if the feedback control operation shown by $\psi_e$ is started, the purification ratio $\psi$ starts to fall from the point e' on the curve $\psi_e$ of the same purification ratio $\psi$ as the point d. Next, if the feedback control operation shown by $\psi_e$ is performed for the time $t_e$, the purification ratio $\psi$ of the exhaust gas falls to the point e on the curve $\psi_e$.

At this time, the point on the curve $\psi_f$ giving the same purification ratio $\psi$ as the point e of the curve $\psi_e$ is shown by f'. That is, if the feedback control operation shown by $\psi_c$ is performed for the time $t_c$, the feedback control operation shown by $\psi_d$ is performed for the time $t_d$, and the feedback control operation shown by $\psi_e$ is performed for the time $t_e$, the purification ratio $\psi$ of the exhaust gas will become the purification ratio shown by the point f' on the curve $\psi_f$. As opposed to this, if the feedback control operation shown by $\psi_f$ is performed for the time $t_f$, the purification ratio $\psi$ becomes the purification ratio shown by the point f' on the curve $\psi_f$. Therefore, the operating time required for obtaining the same state of deterioration of performance of the three-way catalyst 12 as when raising the catalyst temperature T at the time when the feedback control operations shown by $\psi_c$, $\psi_d$, and $\psi_e$ are being performed to the catalyst temperature T at the time when the feedback control shown by $\psi_f$ is being performed is shortened from $t_c+t_d+t_e$ to $t_f$.

Next, a method of finding the purification ratio $\psi$ of the exhaust gas by a completely different method using probability and shortening the operating time based on the purification ratio $\psi$ of the exhaust gas will be explained.

That is, as mentioned earlier, as the operating time becomes longer, the particle size of the platinum Pt in the catalyst gradually increases. When the particle size of the platinum Pt becomes larger, the number of particles of the platinum Pt declines. As a result, the sum of the surface area of all of the platinum Pt gradually declines, so the purification ratio $\psi$ of the exhaust gas gradually falls. In this case, the gradual decline of the sum of the surface area of all of the platinum Pt can be considered to be equivalent to a gradual increase of the rate of failure of the elements performing the catalytic function. Therefore, it is possible to find the purification ratio $\psi$ of the exhaust gas from the rate of failure of the elements performing the catalytic function.

However, it is known that the rate of failure can be found from the following Weibull distribution function:

$$R(t)=1-F(t)=\exp(-t^m/t_0)$$

Here, F(t) shows the failure rate, therefore R(t) shows the probability that no failure will occur. Further, t shows the elapsed time, m shows a variable, and $t_0$ shows a coefficient. If this Weibull function is applied for calculation of the purification ratio $\psi$ of the exhaust gas, the probability R(t) that no failure will occur will correspond to the purification ratio $\psi$ of the exhaust gas and t will correspond to the operating time. Therefore, if using a Weibull distribution function, the purification ratio $\psi$ of the exhaust gas is expressed by the following equation:

$$\psi=\exp(-t^m/t_0)$$

Here, the logarithm of the above equation becomes as follows:

$$l_n(1/\psi)=t^m/t_0$$

Here, if the coefficient to is replaced by (1/C), the above equation becomes as follows:

$$l_n(1/\psi)=C\cdot t^m$$

On the other hand, if the left side of the above equation is developed by the Taylor expansion method and items of the second and later order are ignored, the left side of the above equation can be rewritten as follows:

$$l_n(1/\psi)=1-\psi$$

That is, $l_n(1/\psi)$ shows the degree of decline of the purification ratio $\psi$ of the exhaust gas.

On the other hand, the above mentioned strictly found purification ratio $\psi$ of the exhaust gas is expressed by the following equation:

$$\psi=\psi_0-A\cdot\exp(-B/T)\cdot[O_2]^\alpha\cdot t^m$$

As opposed to this, the purification ratio $\psi$ of the exhaust gas using the Weibull distribution function is expressed as follows:

$$\psi=\psi_0-C\cdot t^m \text{ (where, 1 is replaced by } \psi_0)$$

As will be understood from a comparison of these two equations, these two equations resemble each other considerably in form.

Next, the purification ratio $\psi$ of the exhaust gas using the Weibull distribution function and the experimental findings will be explained with reference to FIG. 15. If the logarithm of both sides of the equation $\psi=\exp(-t^m/t_0)$ showing the purification ratio of the exhaust gas is taken twice, the following equation is obtained:

$$l_n l_n(1/\psi) = m l_n t - l_n t_0$$

Figure 15:
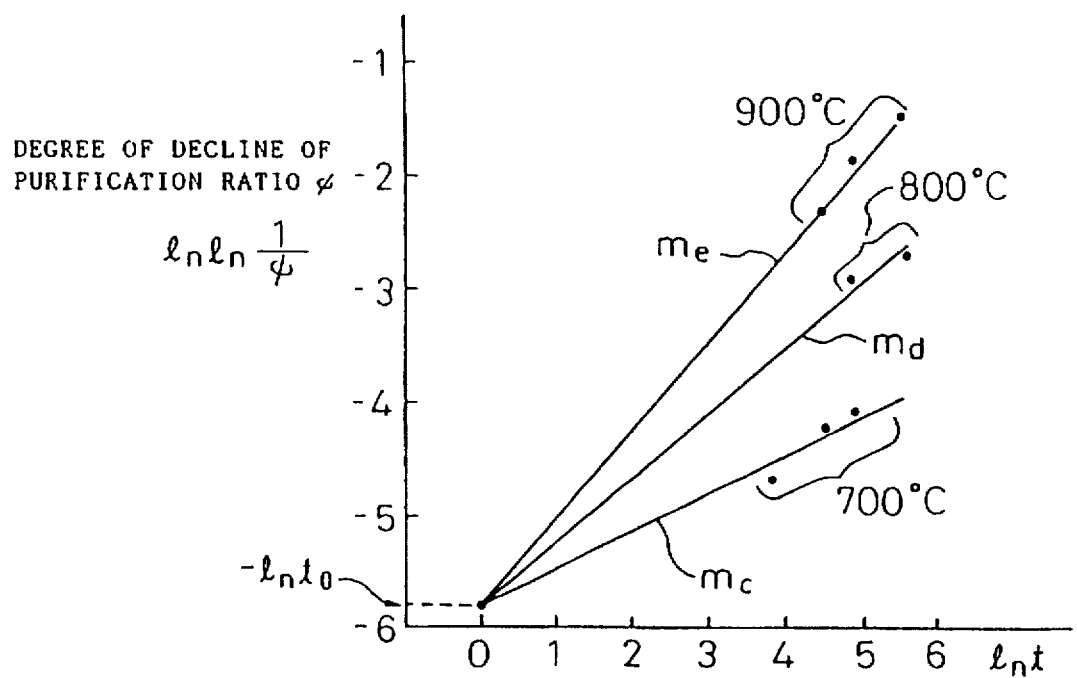
FIG. 15 is a view of the degrees of decline of the exhaust gas purification ratio.

The vertical axis $l_n l_n(1/\psi)$ of FIG. 15 shows the left side of the above equation, therefore the vertical axis $l_n l_n(1/\psi)$ of FIG. 15 shows the degree of decline of the purification ratio $\psi$ of the exhaust gas. The horizontal axis $l_n t$ of FIG. 15 shows the operating time. Further, in FIG. 15, the black dots show the experimental values when performing feedback control and maintaining the temperature T of the three-way catalyst 12 at 700° C., 800° C., and 900° C. As shown in FIG. 15, the experimental values are substantially positioned on the lines obtained by changing only the value of m showing the inclination in the above equation, therefore it is learned that it is possible to use a Weibull distribution function to calculate the purification ratio $\psi$ of the exhaust gas. Note that as will be understood from FIG. 15, the value of m showing the inclination in the above equation becomes a function of the catalyst temperature T and, as will be understood from $m_c$, $m_d$, and $m_e$, the higher the catalyst temperature T becomes, the larger the value of m.

On the other hand, as mentioned earlier the purification ratio $\psi$ of the exhaust gas can be expressed by the following equation:

$$l_n(1/\psi) = C \cdot t^m \text{ (C is a coefficient)}$$

Figure 16:
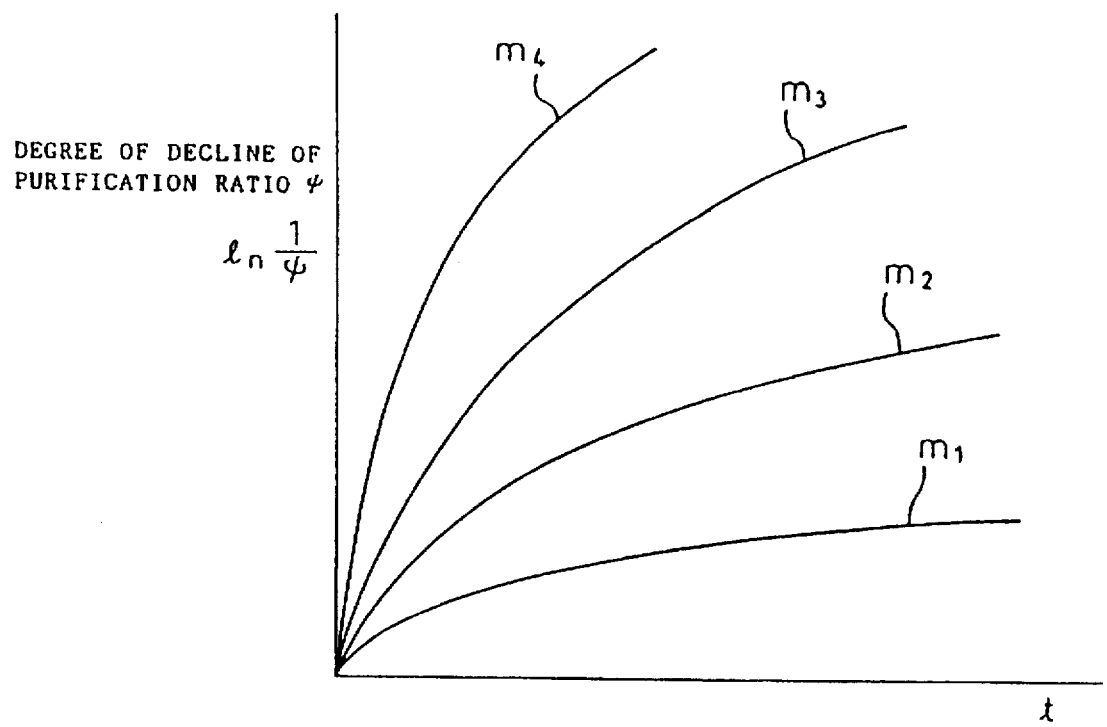
FIG. 16 is a view of the degrees of decline of the exhaust gas purification ratio.

The vertical axis $l_n(1/\psi)$ of FIG. 16 shows the left side of the above equation, while the horizontal axis t of FIG. 16 shows the operating time. The curves show curves in the case of different values of m. The values of m were found from the experimental values shown in FIG. 15. Note that each of the curves shows the change in the degree of decline $l_n(1/\psi)$ of the purification ratio $\psi$ at the time of a feedback control operation. The catalyst temperature T when the feedback control operation is performed becomes higher with a larger value of m, that is, becomes higher in the order of $m_1$, $m_2$, $m_3$, and $m_4$.

Next, the method of shortening the operating time based on the purification ratio $\psi$ of the exhaust gas using a Weibull distribution function will be briefly explained. In this case as well, as shown in FIG. 10, first, the time in the representative driving pattern shown in FIG. 9 where the air-fuel ratio is made rich, the time where the air-fuel ratio is maintained at the stoichiometric air-fuel ratio by feedback control, and the time when the fuel injection is stopped are calculated for each of the predetermined temperature ranges of the catalytic bed $T_1$, $T_2$, $T_3$, $T_4$, $T_5$, $T_6$, $T_7$, $T_8$, and $T_9$.

Next, as shown in FIGS. 11(C) and (G), the feedback control times in the catalytic bed temperature ranges from $T_1$ to $T_8$ are shortened to the feedback control time in the catalytic bed temperature range $T_9$ and added. On the other hand, as shown in FIGS. 11(B) and (F), the rich operating state is maintained as it is and, as shown in FIGS. 11(D) and (H), the fuel cut state is maintained as it is. Next, the engine is operated by the time-shortened driving pattern shown in FIG. 13 in accordance with the rich operating time, fuel cut time, and feedback control time shown in FIG. 12.

In this way, even when the operating time is shortened based on the purification ratio $\psi$ of the exhaust gas using a Weibull distribution function, only the feedback control time is shortened. Next, the method of shortening the feedback control time will be explained with reference to FIG. 17. Note that the curves $m_1$, $m_2$, $m_3$, and $m_4$ in FIG. 17 show the same curves as the curves $m_1$, $m_2$, $m_3$, and $m_4$ in FIG. 16.

As shown in FIG. 10, for example, when dividing the temperature range of the catalytic bed into nine regions $T_1$, $T_2$, $T_3$, $T_4$, $T_5$, $T_6$, $T_7$, $T_8$, and $T_9$, nine curves showing the degree of decline $l_n(1/\psi)$ of the purification ratio $\psi$ corresponding to the regions are calculated. FIG. 17 is drawn only for explaining the method of shortening the feedback control time, therefore FIG. 17 shows only four representative curves $m_1$, $m_2$, $m_3$, and $m_4$ showing degrees of decline $l_n(1/\psi)$ of the purification ratio $\psi$ among the nine curves showing the degrees of decline $l_n(1/\psi)$ of the purification ratio $\psi$.

Figure 17:
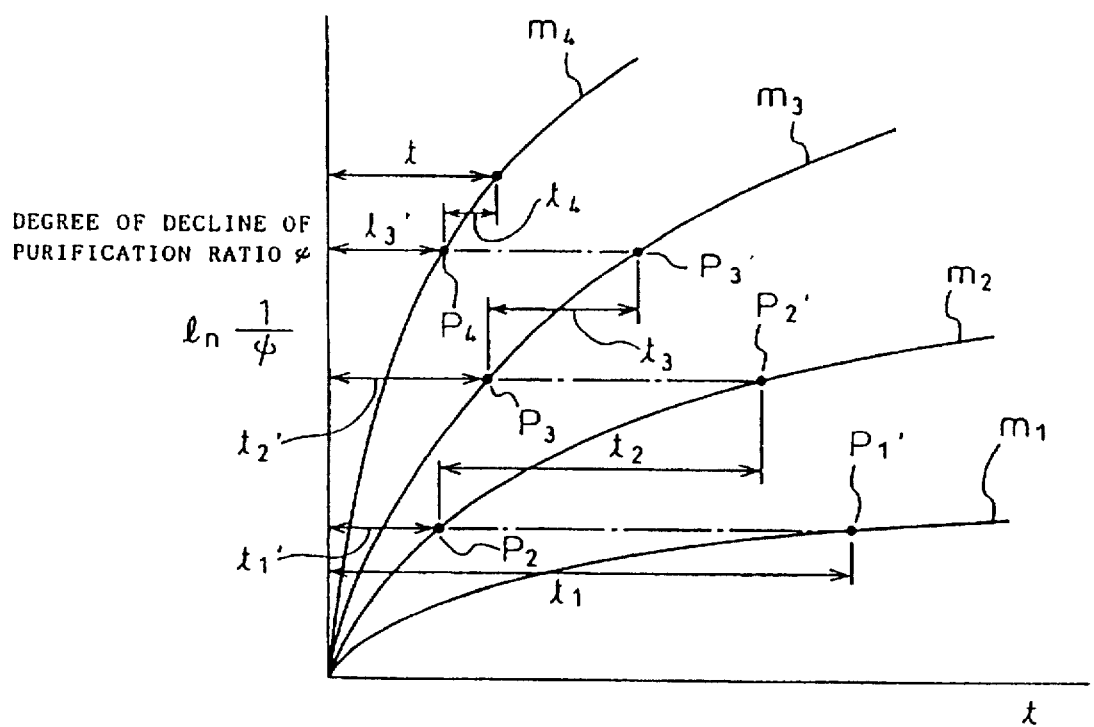
FIG. 17 is a view of the degrees of decline of the exhaust gas purification ratio.

FIG. 17 shows the method of finding the shortened operating time when the feedback control operation shown by $m_1$ is performed for the time $t_1$, the feedback control operation shown by $m_2$ is performed for the time $t_2$, and the feedback control operation shown by $m_3$ is performed for the time $t_3$, raising the catalyst temperature T when performing the feedback control operations shown by these $m_1$, $m_2$, and $m_3$ to the catalyst temperature T when the feedback control operation shown by $m_4$ is being performed.

If the feedback control operation shown by $m_1$ in FIG. 17 is performed for the time $t_1$, the degree of decline $l_n(1/\psi)$ of the purification ratio $\psi$ of the exhaust gas becomes the point $P_1'$ on the curve $m_1$. Next, when the feedback control operation shown by $m_2$ is started, the rate of decline $l_n(1/\psi)$ of the purification ratio $\psi$ starts to rise from the point $P_2$ on the curve $m_2$ of the same degree of decline $l_n(1/\psi)$ of the purification ratio $\psi$ as the point $P_1'$. Next, if the feedback control operation shown by $m_2$ is performed for the time $t_2$, the rate of decline $l_n(1/\psi)$ of the purification ratio $\psi$ of the exhaust gas becomes the point $P_2'$ on the curve $m_2$. Next, when the feedback control operation shown by $m_3$ is started, the degree of decline $l_n(1/\psi)$ of the purification ratio $\psi$ starts to rise from the point $P_3$ on the curve $m_3$ of the same degree of decline $l_n(1/\psi)$ of the purification ratio $\psi$ as the point $P_2'$. Next, if the feedback control operation shown by $m_3$ is performed for the time $t_3$, the degree of decline $l_n(1/\psi)$ of the purification ratio $\psi$ of the exhaust gas becomes the point $P_3'$ on the curve $m_3$.

At this time, the point on the curve $m_4$ of the same degree of decline $l_n(1/\psi)$ of the purification ratio $\psi$ as the point $P_3'$ on the curve $m_3$ is shown as $P_4$. That is, if the feedback control operation shown by $m_1$ is performed for the time $t_1$, the feedback control operation shown by $m_2$ is performed for the time $t_2$, and the feedback control operation shown by $m_3$ is performed for the time $t_3$, the degree of decline $l_n(1/\psi)$ of the purification ratio $\psi$ of the exhaust gas becomes the degree of decline of the purification ratio shown as the point $P_4$ on the curve $m_4$. As opposed to this, if the feedback control operation shown by $m_4$ is performed for the time $t_3'$, the degree of decline $l_n(1/\psi)$ of the purification ratio $\psi$ becomes the degree of decline of the purification ratio shown by the point $P_4$ on the curve $m_4$. Therefore, if the catalyst temperature T when the feedback control operations shown by $m_1$, $m_2$, and $m_3$ are being performed is raised to the catalyst temperature T when feedback control shown by $m_4$ is being performed, the operating time required for obtaining the same state of deterioration of the three-way catalyst 12 is shortened from $t_1+t_2+t_3$ to $t_3'$.

Note that this shortened operating time $t_3'$ can be calculated using $t_1$, $t_2$, $t_3$, $m_1$, $m_2$, $m_3$, and $m_4$. That is, the degree of decline $l_n(1/\psi)$ of the purification ratio $\psi$ when the feedback control shown by $m_1$ in FIG. 17 is performed for the time $t_1$ and the degree of decline $l_n(1/\psi)$ of the purification ratio $\psi$ when the feedback control shown by $m_2$ is performed for the time $t_1'$ become equal to each other. That is, $l_n(1/\psi) = C \cdot t_1^{m_1} = C \cdot t_1'^{m_2}$. Therefore, $t_1'$ becomes $t_1' = t_1^{m_1/m_2}$.

On the other hand, the degree of decline $l_n(1/\psi)$ of the purification ratio $\psi$ when the feedback control shown by $m_2$ in FIG. 17 is performed for the time $t_1'+t_2$ and the degree of decline $l_n(1/\psi)$ of the purification ratio $\psi$ when the feedback control shown by $m_3$ is performed for the time $t_2'$ become equal to each other. That is, $l_n(1/\psi)=C\cdot(t_1'+t_2)^{m2}=C\cdot t_2'^{m3}$. Therefore, $t_2'$ becomes $t_2'=(t_1'+t_2)^{m2/m3}$. If $t_1'=t_1^{m1/m2}$ is substituted in this equation, $t_2'$ becomes $t_2'= (t_1^{m1/m2}+t_2)^{m2/m3}$.

On the other hand, the degree of decline $l_n(1/\psi)$ of the purification ratio $\psi$ when the feedback control shown by $m_3$ in FIG. 17 is performed for the time $t_2'+t_3$ and the degree of decline $l_n(1/\psi)$ of the purification ratio $\psi$ when the feedback control shown by $m_4$ is performed for the time $t_3'$ become equal to each other. That is, $l_n(1/\psi)=C\cdot(t_2'+t_3)^{m3}=C\cdot t_3'^{m4}$. Therefore, $t_3'$ becomes $t_3'=(t_2'+t_3)^{m3/m4}$. If $t_2'= (t_1^{m1/m2}+t_2)^{m2/m3}$ is substituted in this equation, $t_3'$ becomes $t_3'=|(t_1^{m1/m2}+t_2)^{m2/m3}+t_3|^{m3/m4}$. This shortened operating time $t_3'$ can be expressed using $t_1$, $t_2$, $t_3$, $m_1$, $m_2$, $m_3$, and $m_4$.

Note that as shown in FIG. 17, the feedback control operation shown by $m_4$ is further performed for the time $t_4$. At this time, the total time where the feedback control operation shown by $m_4$ is performed becomes $t=|(t_1^{m1/m2}+t_2)^{m2/m3}+t_3|^{m3/m4}+t_4$.

As explained above, according to the present invention, it is possible to create in a short time the state of deterioration of a catalyst of when a vehicle is market driven for a long period of time and therefore it is possible to shorten the development time of a vehicle since the exhaust purification performance can be evaluated in a short time.

We claim:

1. A method of testing durability of an exhaust gas purification device by creating a same state of deterioration of the exhaust gas purification device as if a vehicle were actually market driven for a predetermined target driving distance or target driving time, comprising: obtaining in advance a relationship between a magnitude of stress causing deterioration of an exhaust gas purification catalyst and a representative value indicative of a degree of deterioration of a performance of the catalyst; obtaining a shortened deterioration time taken for the catalyst to reach about a same degree of deterioration as when the vehicle is market driven for the target driving distance or target driving time under a higher stress than the catalyst has when the vehicle is market driven from the above relationship; and applying high stress to the catalyst over a shortened deterioration time in operating the engine or the vehicle.

2. A method of testing durability of an exhaust gas purification device as set forth in claim 1, wherein the stress causing deterioration of a performance of the catalyst is the temperature of a catalytic bed whose increase causes an increase of a degree of deterioration of performance of the catalyst.

3. A method of testing durability of an exhaust gas purification device as set forth in claim 2, wherein the representative value indicative of a degree of deterioration of performance of the catalyst is a rate of deterioration of performance of the catalyst which becomes faster with an increase of the temperature of a catalytic bed.

4. A method of testing durability of an exhaust gas purification device as set forth in claim 3, wherein a rate of deterioration K of a performance of the catalyst is expressed with the temperature of a catalytic bed T by the equation $lnK=C_1-C_2/T$ (where $C_1$ and $C_2$ are coefficients).

5. A method of testing durability of an exhaust gas purification device as set forth in claim 2, wherein the representative value indicative of a degree of deterioration of a performance of the catalyst is a degree of deterioration of a performance of the catalyst with respect to an operating time of the engine or the vehicle and the representative value is expressed with the temperature of a catalytic bed T and an operating time t of the engine or the vehicle by the expression $A\cdot exp(-B/T)\cdot t^m$ (where A and B are coefficients and m is 1.0 or a positive number smaller than 1.0).

6. A method of testing durability of an exhaust gas purification device as set forth in claim 2, wherein the representative value indicative of a degree of deterioration of a performance of the catalyst is a degree of deterioration of a performance of the catalyst with respect to an operating time of the engine or the vehicle and the representative value is expressed as a function of the temperature of a catalytic bed by the expression $C\cdot t^m$, where C is a coefficient, and m is a positive number, and t is an operating time of the engine or the vehicle.

7. A method of testing durability of an exhaust gas purification device as set forth in claim 6, wherein said m becomes larger with a higher temperature of a catalytic bed.

8. A method of testing durability of an exhaust gas purification device as set forth in claim 1, wherein a stress causing deterioration of a performance of the catalyst is an oxygen concentration in the exhaust gas and a degree of deterioration of the performance of the catalyst changes along with a change in the oxygen concentration in the exhaust gas.

9. A method of testing durability of an exhaust gas purification device as set forth in claim 8, wherein the representative value indicative of a degree of deterioration of a performance of the catalyst is a rate of deterioration of a performance of the catalyst which changes along with a change in the oxygen concentration in the exhaust gas.

10. A method of testing durability of an exhaust gas purification device as set forth in claim 9, wherein the rate of deterioration K of a performance of the catalyst is expressed with the oxygen concentration $[O_2]$ in the exhaust gas by the equation $lnK=\alpha ln[O_2]$ (wherein $\alpha$ is a coefficient).

11. A method of testing durability of an exhaust gas purification device as set forth in claim 10, wherein the representative value indicative of a degree of deterioration of a performance of the catalyst is a degree of deterioration of a performance of the catalyst with respect to an operating time of the engine or the vehicle, and the representative value is expressed with the oxygen concentration ($O_2$) in the exhaust gas and an operating time t of the engine or the vehicle by the expression $A(O_2)^\alpha \cdot t^m$ (where A and $\alpha$ are coefficients, and m is 1.0 or a positive number smaller than 1.0).

12. A method of testing durability of an exhaust gas purification device as set forth in claim 11, wherein the representative value indicative of a degree of deterioration of a performance of the catalyst is a degree of deterioration of a performance of the catalyst with respect to an operating time of the engine or vehicle, and wherein the representative value is expressed as a function of the temperature of a catalytic bed by the expression $C\cdot t^m$, where C is a coefficient, and m is a positive number, and t is an operating time of the engine or the vehicle.

13. A method of testing durability of an exhaust gas purification device as set forth in claim 1, wherein the stress causing deterioration of a performance of the catalyst is the temperature of a catalytic bed and oxygen concentration in the exhaust gas, and wherein an increase of a temperature of the catalytic bed causes an increase of a degree of deterioration of a performance of the catalyst, and a degree of deterioration of a performance of the catalyst changes along with a change of the oxygen concentration in the exhaust gas.

14. A method of testing durability of an exhaust gas purification device as set forth in claim 13, wherein the representative value indicative of a degree of deterioration of a performance of the catalyst is a degree of deterioration of a performance of the catalyst with respect to an operating time of the engine or the vehicle, and the representative value is expressed with the temperature of a catalytic bed T, the oxygen concentration ($O_2$) in the exhaust gas, and an operating time t of the engine or the vehicle by the expression $A \cdot \exp(-B/T) \cdot (O_2)^\alpha \cdot t^m$ (where A, B, and $\alpha$ are coefficients, and m is 1.0 or a positive number smaller than 1.0).

15. A method of testing durability of an exhaust gas purification device as set forth in claim 13, wherein the representative value indicative of a degree of deterioration of a performance of the catalyst is a degree of deterioration of a performance of the catalyst with respect to an operating time of the engine or the vehicle, and wherein the representative value is expressed as a function of the temperature of a catalytic bed by the expression $C \cdot t^m$, where C is a coefficient, and m is a positive number, and t is an operating time of the engine or the vehicle.

16. A method of testing durability of an exhaust gas purification device as set forth in claim 15, wherein said m becomes larger with a higher temperature of a catalytic bed.

17. A method of testing durability of an exhaust gas purification device as set forth in claim 1, wherein the air-fuel ratio is feedback controlled in at least part of an operating region when the vehicle is being market driven, the high stress is applied to the catalyst during feedback control of the air-fuel ratio in operating the engine or vehicle, and the high stress is the temperature of a catalytic bed.

18. A method of testing durability of an exhaust gas purification device as set forth in claim 1, wherein the step for obtaining the relationship in advance obtains the relationship between a magnitude of the stress causing deterioration of the exhaust gas purification catalyst and air-fuel ratio feedback oxygen concentration sensor and a representative value indicative of a degree of deterioration of a performance of the catalyst and oxygen concentration sensor, the step for obtaining a shortened deterioration time determines a time taken for the catalyst and oxygen concentration sensor to reach substantially a same degree of deterioration as when the vehicle is market driven for said target driving distance or target driving time under a higher stress than the catalyst and oxygen concentration sensor has at the time of market driving of the vehicle from said relationship, and the step of applying high stress applies a high stress to the catalyst and oxygen concentration sensor over a shortened deterioration time in operating the engine or vehicle.

19. A method of testing durability of an exhaust gas purification device as set forth in claim 1, wherein a total amount of an accumulative type catalyst poisoning included in the fuel consumed when the vehicle is market driven by said target driving distance or target driving time is supplied while the engine or the vehicle is operated by a time-shortened driving pattern.

20. A method of testing durability of an exhaust gas purification device which creates, on a bench dynamometer or chassis dynamometer, a same state of deterioration of the exhaust gas purification device as if a vehicle is actually market driven, said method comprising: creating a representative driving pattern indicative of the market driving of the vehicle; obtaining in advance a relationship between a magnitude of stress causing deterioration of a performance of an exhaust gas purification catalyst and a representative value indicative of a degree of deterioration of a performance of the catalyst; obtaining a time-shortened driving pattern for applying to the catalyst a stress higher than the stress applied to the catalyst from a relationship when the vehicle is driven so that substantially a same degree of deterioration of a performance of the catalyst at a time of completion of driving of the vehicle by the representative driving pattern is caused; and driving the engine or the vehicle on a bench dynamometer or chassis dynamometer by this time-shortened driving pattern.

21. A method of testing durability of an exhaust gas purification device as set forth in claim 20, wherein the stress causing deterioration of a performance of the catalyst is the temperature of a catalytic bed whose increase causes an increase of a degree of deterioration of a performance of the catalyst.

22. A method of testing durability of an exhaust gas purification device as set forth in claim 21, wherein said representative driving pattern includes various driving states of different catalytic bed temperatures, and wherein the time-shortened driving pattern is determined by replacing at least one part of the driving states among these driving states with a driving state having a higher catalytic bed temperature, and wherein the driving time in the replaced driving state is determined based on a relationship so as to give substantially a same degree of deterioration of performance of the catalyst as when the driving in pre-replaced driving states is completed.

23. A method of testing durability of an exhaust gas purification device as set forth in claim 22, wherein the various driving states in said representative driving pattern are classified based on a catalytic bed temperature and classified driving states are expressed by driving times.

24. A method of testing durability of an exhaust gas purification device as set forth in claim 22, wherein the various driving states in said representative driving pattern include a target air-fuel ratio driving state where the air-fuel ratio is maintained at the target air-fuel ratio by feedback control, a rich side driving state where the air-fuel ratio is smaller than the target air-fuel ratio, and a lean side driving state where the air-fuel ratio is larger than the target air-fuel ratio, said target air-fuel ratio driving state, rich side driving state, and lean side driving state are classified based on a catalytic bed temperature and expressed by the driving time.

25. A method of testing the durability of an exhaust gas purification device as set forth in claim 24, wherein only said target air-fuel ratio driving state is replaced with a target air-fuel ratio driving state having a higher catalytic bed temperature.

26. A method of testing durability of an exhaust gas purification device as set forth in claim 25, wherein only said target air-fuel ratio driving state is replaced with a target air-fuel ratio driving state having a predetermined catalytic bed temperature equal to or higher than a maximum catalytic bed temperature at the target air-fuel ratio driving state.

27. A method of testing durability of an exhaust gas purification device as set forth in claim 25, wherein said time-shortened driving pattern comprises a replaced target air-fuel ratio driving state, nonreplaced rich side driving state, and nonreplaced lean side driving state and carries out the rich side driving state and lean side driving state alternately and then the target air-fuel ratio driving state.

28. A method of testing durability of an exhaust gas purification device as set forth in claim 27, wherein in said time-shortened driving pattern, a catalytic bed temperature is gradually raised while alternately repeating the rich side driving state and lean side driving state, then at a maximum catalytic bed temperature the target air-fuel ratio driving state is maintained.

29. A method of testing durability of an exhaust gas purification device as set forth in claim 24, wherein said target air-fuel ratio driving state, rich side driving state, and lean side driving state are replaced with each corresponding state but having a higher catalytic bed temperature.

30. A method of testing durability of an exhaust gas purification device as set forth in claim 29, wherein said time-shortened driving pattern comprises a substituted target air-fuel ratio driving state, a substituted rich side driving state, and a substituted lean side driving state.

31. A method of testing durability of an exhaust gas purification device as set forth in claim 21, wherein the representative value indicative of a degree of deterioration of a performance of the catalyst is a rate of deterioration of a performance of the catalyst which increases with a rise of the temperature of a catalytic bed.

32. A method of testing durability of an exhaust gas purification device as set forth in claim 31, wherein a rate of deterioration K of a performance of the catalyst is expressed with the temperature of a catalytic bed T by $\ln K = C_1 - C_2/T$ (wherein $C_1$ and $C_2$ are coefficients).

33. A method of testing durability of an exhaust gas purification device as set forth in claim 21, wherein the representative value indicative of a degree of deterioration of a performance of the catalyst is a degree of deterioration of a performance of the catalyst with respect to an operating time of the engine or the vehicle and the representative value is expressed with the temperature of a catalytic bed T and an operating time t of the engine or the vehicle by the expression $A \cdot \exp(-B/T) \cdot t^m$ (where A and B are coefficients, and m is 1.0 or a positive number smaller than 1.0).

34. A method of testing durability of an exhaust gas purification device as set forth in claim 21, wherein the representative value indicative of a degree of deterioration of a performance of the catalyst is a degree of deterioration of a performance of the catalyst with respect to an operating time of the engine or the vehicle and the representative value is expressed as a function of the temperature of a catalytic bed by the expression $C \cdot t^m$, where C is a coefficient, and m is a positive number, and t is an operating time of the engine or the vehicle.

35. A method of testing durability of an exhaust gas purification device as set forth in claim 34, wherein said value m becomes larger the higher the temperature of a catalytic bed.

36. A method of testing durability of an exhaust gas purification device as set forth in claim 35, wherein said representative driving pattern includes various driving states with different catalytic bed temperatures, a degree of deterioration of a performance of the catalyst in at least one part of the driving states among these driving states is expressed by $ct^{m1}$, $ct^{m2}$, $ct^{m3}$, and $ct^{m4}$ in the increasing order of the catalytic bed temperatures, said at least one part of the driving states is maintained for the times $t_1$, $t_2$, $t_3$, and $t_4$ in the increasing order of the catalytic bed temperatures, and the driving time is expressed by $[(t_1{}^{m1/m2} + t_2)^{m2/m3} + t_3]^{m3/m4} + t_4$ when the catalytic bed temperature of the driving states of a degree of deterioration of a performance of the catalyst expressed by $ct^{m1}$, $ct^{m2}$, and $ct^{m3}$ reach the catalytic bed temperature of the driving state of the catalytic bed temperature $ct^{m4}$.

37. A method of testing durability of an exhaust gas purification device as set forth in claim 20, wherein the stress causing deterioration of a performance of the catalyst is an oxygen concentration in the exhaust gas and a degree of deterioration of a performance of the catalyst changes along with a change in the oxygen concentration in the exhaust gas.

38. A method of testing durability of an exhaust gas purification device as set forth in claim 37, wherein the representative value indicative of a degree of deterioration of a performance of the catalyst is a rate of deterioration of a performance of the catalyst which changes along with a change of the oxygen concentration of the exhaust gas.

39. A method of testing a durability of an exhaust gas purification device as set forth in claim 38, wherein a rate of deterioration K of a performance of the catalyst is expressed with the oxygen concentration $|O_2|$ in the exhaust gas by the equation $\ln K = \alpha \ln |O_2|$ (where $\alpha$ is a coefficient).

40. A method of testing durability of an exhaust gas purification device as set forth in claim 37, wherein the representative value indicative of a degree of deterioration of a performance of the catalyst is a degree of deterioration of a performance of the catalyst with respect to an operating time of the engine or the vehicle and the representative value is expressed with the oxygen concentration ($O_2$) in the exhaust gas and an operating time t of the engine or the vehicle by the expression $A \cdot (O_2)^\alpha \cdot t^m$ (where A and $\alpha$ are coefficients, and m is 1.0 or a positive number smaller than 1.0).

41. A method of testing durability of an exhaust gas purification device as set forth in claim 37, wherein the representative value indicative of a degree of deterioration of a performance of the catalyst is a degree of deterioration of a performance of the catalyst with respect to an operating time of the engine or the vehicle and the representative value is expressed as a function of the temperature of a catalytic bed by the expression $C \cdot t^m$, where C is a coefficient, and m is a positive number, and t is the operating time of the engine or the vehicle.

42. A method of testing durability of an exhaust gas purification device as set forth in claim 20, wherein the stress causing deterioration of a performance of the catalyst is the temperature of a catalytic bed and oxygen concentration in the exhaust gas, and wherein an increase of the temperature of a catalytic bed causes an increase of a degree of deterioration of a performance of the catalyst, and a degree of deterioration of the performance of the catalyst changes along with a change of the oxygen concentration in the exhaust gas.

43. A method of testing durability of an exhaust gas purification device as set forth in claim 42, wherein the representative value indicative of a degree of deterioration of a performance of the catalyst is a degree of deterioration of a performance of the catalyst with respect to an operating time of the engine or the vehicle and the representative value is expressed with the temperature of a catalytic bed T, the oxygen concentration ($O_2$) in the exhaust gas, and an operating time t of the engine or the vehicle by the expression $A \cdot \exp(-B/T) \cdot (O_2)^\alpha \cdot t^m$ (where A, B, and $\alpha$ are coefficients, and m is 1.0 or a positive number smaller than 1.0).

44. A method of testing durability of an exhaust gas purification device as set forth in claim 43, wherein the representative value indicative of a degree of deterioration of a performance of the catalyst is a degree of deterioration of a performance of the catalyst with respect to an operating time of the engine or the vehicle, and wherein the representative value is expressed as a function of the temperature of a catalytic bed by the expression $C \cdot t^m$, where C is a coefficient, and m is a positive number, and t is an operating time of the engine or the vehicle.

45. A method of testing durability of an exhaust gas purification device as set forth in claim 44, wherein said value m becomes larger with an increase of the temperature of a catalytic bed.

46. A method of testing durability, of an exhaust gas purification device as set forth in claim 20, wherein the step for creating a representative driving pattern creates a representative driving pattern representative of the market driving of the vehicle, the step of obtaining a relationship in advance obtains in advance a relationship between the magnitude of the stress causing deterioration of a performance of the exhaust gas purification catalyst and air-fuel ratio feedback oxygen concentration sensor and a representative value indicative of a degree of deterioration of a performance of the catalyst and oxygen concentration sensor, the step for obtaining a time-shortened driving pattern obtains a time-shortened driving pattern for applying to the catalyst and oxygen concentration sensor a stress higher than the stress applied to the catalyst and oxygen concentration sensor from a relationship when the vehicle is driven so that substantially the same degree of deterioration of a performance of the catalyst and oxygen concentration sensor at the time of completion of driving of the vehicle by the representative driving pattern is caused, and the step of driving the engine or the vehicle drives the engine or vehicle on a bench dynamometer or chassis dynamometer by this time-shortened driving pattern.

47. A method of testing durability of an exhaust gas purification device as set forth in claim 20, wherein the step of driving the engine or vehicle is carried out while supplying a total amount of an accumulative type catalyst poisoning included in the fuel consumed when the vehicle is market driven by a representative driving pattern while the engine or the vehicle is operated by said time-shortened driving pattern on the bench dynamometer or chassis dynamometer.

* * * * *